United States Patent
Fukushima et al.

(10) Patent No.: US 11,874,854 B2
(45) Date of Patent: Jan. 16, 2024

(54) INFORMATION PROCESSING APPARATUS, INFORMATION PROCESSING METHOD, AND COMPUTER PROGRAM

(71) Applicant: KABUSHIKI KAISHA TOSHIBA, Tokyo (JP)

(72) Inventors: Arika Fukushima, Tokyo (JP); Myungsook Ko, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 223 days.

(21) Appl. No.: 17/015,279

(22) Filed: Sep. 9, 2020

(65) Prior Publication Data
US 2021/0209132 A1 Jul. 8, 2021

(30) Foreign Application Priority Data
Jan. 6, 2020 (JP) ................................. 2020-000550

(51) Int. Cl.
*G06F 16/28* (2019.01)

(52) U.S. Cl.
CPC .................................. *G06F 16/285* (2019.01)

(58) Field of Classification Search
CPC .... G06F 16/35; G06F 16/338; G06F 16/3346; G06N 20/00
USPC ....................................................... 707/738
See application file for complete search history.

(56) References Cited

U.S. PATENT DOCUMENTS

| 10,136,249 | B2 | 11/2018 | Ikemoto et al. | |
| 10,998,101 | B1* | 5/2021 | Tran | G06N 3/08 |
| 11,093,819 | B1* | 8/2021 | Li | G06N 3/084 |
| | | | | 707/999.003 |
| 11,548,533 | B2* | 1/2023 | Liang | G06V 10/82 |
| | | | | 707/999.003 |
| 2013/0345585 | A1 | 12/2013 | Gopal Samy et al. | |
| 2014/0067476 | A1 | 3/2014 | Seki et al. | |
| 2019/0042956 | A1* | 2/2019 | Huang | G06F 16/24578 |
| 2019/0102840 | A1* | 4/2019 | Perl | G06N 3/08 |

(Continued)

FOREIGN PATENT DOCUMENTS

| JP | 2017-55913 A | 3/2017 |
| JP | 6129082 B2 | 5/2017 |

(Continued)

OTHER PUBLICATIONS

Global Information, Inc., "Global Clinical Rehabilitation Service Market Size, Status and Forecast 2020-2026," (Apr. 22, 2020), 7 pages (https://www.gii.co.jp/report/gyr753450-global-clinical-rehabilitation-service-market-size.html) and.

(Continued)

*Primary Examiner* — Yuk Ting Choi
(74) *Attorney, Agent, or Firm* — Finnegan, Henderson, Farabow, Garrett & Dunner, LLP

(57) ABSTRACT

According to one embodiment, an information processing apparatus includes an estimator configured to estimate a state of an observation target on a first time, based on data on the first time included in time-series data obtained from the observation target. Also, an information processing method for estimating a state of an observation target on a first time, based on data on the first time included in time-series data obtained from the observation target is provided.

19 Claims, 22 Drawing Sheets

(56) References Cited

U.S. PATENT DOCUMENTS

| | | | |
|---|---|---|---|
| 2019/0342195 A1* | 11/2019 | Mermoud | H04L 63/1425 |
| 2020/0166909 A1* | 5/2020 | Noone | G06N 20/00 |
| 2020/0265195 A1* | 8/2020 | Galitsky | G06F 40/35 |
| 2020/0272160 A1* | 8/2020 | Djuric | G06T 7/20 |
| | | | 707/999.003 |
| 2020/0337648 A1* | 10/2020 | Saripalli | G16H 40/67 |
| 2021/0064388 A1* | 3/2021 | Gardner | G06F 9/442 |

FOREIGN PATENT DOCUMENTS

| | | |
|---|---|---|
| JP | 6181360 B2 | 8/2017 |
| JP | 6334825 B2 | 5/2018 |
| JP | 2018180759 A * | 11/2018 |
| JP | 2019-66989 A | 4/2019 |
| WO | WO 2011/036809 A1 | 3/2011 |

OTHER PUBLICATIONS

Global Information Inc., "Automated Guided Vehicle Market Size, Share & Trends Analysis Report by Vehicle Type, by Navigation Technology, by Application, by end-Use Industry, by Component, by Battery Type, by region, and Segment Forecasts, 2020-2027," (Feb. 10, 2020), 12 pages (https://www.gii.co.jp/report/orv1398857-automated-guided-vehicle-agy-market-anaysis-by.html).

Fukushima et al., "Proposal of a model tree for binary classification using motion sensing," IEE Japan, 3-118, pp. 173-174 (2020) and machine translation (4 pages).

Myungsook Ko, et al., "Proposal of Assistant System for Self-rehabilitation at Home based on Decision Tree: Study of Sanding Task", IEEJ Trans. on Elecs., Info. and Sys., vol. 139, No. 7, pp. 766-773, ISSN 0385-4221 (Jul. 1, 2019).

* cited by examiner

| TIME | FIRST SENSOR ACCELERATION ON X-AXIS | FIRST SENSOR ACCELERATION ON Y-AXIS | ... | M-TH SENSOR TERRESTRIAL MAGNETISM ON Y-AXIS | M-TH SENSOR TERRESTRIAL MAGNETISM ON Z-AXIS |
|---|---|---|---|---|---|
| t | 23.1 | 42.9 | ... | 242.2 | 78.9 |

FIG. 3

| MOVEMENT ID | TIME | TRAINING LABEL (RIGHT/WRONG) | FIRST SENSOR ACCELERATION ON X-AXIS | FIRST SENSOR ACCELERATION ON Y-AXIS | ... | M-TH SENSOR TERRESTRIAL MAGNETISM ON Y-AXIS | M-TH SENSOR TERRESTRIAL MAGNETISM ON Z-AXIS |
|---|---|---|---|---|---|---|---|
| 1 | 1 | WRONG | 23.1 | 42.9 | ... | 242.2 | 78.9 |
| 1 | 2 | WRONG | 31.8 | 52.1 | ... | 790.4 | 798.4 |
| 1 | ... | ... | ... | ... | ... | ... | ... |
| 1 | N | WRONG | ... | ... | ... | ... | ... |
| 2 | 1 | RIGHT | 53.9 | 64.6 | ... | 42.3 | 525.8 |
| 2 | 2 | RIGHT | 75.2 | 52.7 | ... | 456.9 | 31.6 |
| 2 | ... | ... | ... | ... | ... | ... | ... |
| 2 | N | RIGHT | 74.2 | 51.7 | ... | 426.9 | 29.6 |
| 3 | 1 | WRONG | 65.2 | 52.7 | ... | 356.9 | 81.6 |
| 3 | 2 | WRONG | 64.2 | 51.5 | ... | 856.9 | 600.6 |
| ... | ... | | ... | ... | ... | ... | ... |

FIG. 4

BRANCH CONDITION TABLE

| NODE ID | NODE TYPE | THRESHOLD | MODEL ID | LEFT NODE ID | RIGHT NODE ID |
|---|---|---|---|---|---|
| 1 | ROOT | 12 | NA | 2 | 3 |
| ... | ... | ... | ... | ... | ... |
| G | LEAF | NA | S | NA | NA |

MODEL PARAMETER TABLE

| MODEL ID | PARAMETER 1 | ... | PARAMETER F | IDENTIFICATION PERFORMANCE |
|---|---|---|---|---|
| 1 | 1.5 | ... | 2.9 | LOW |
| ... | ... | ... | ... | ... |
| S | 0 | ... | 3.7 | HIGH |

FIG. 6

| MOVEMENT ID | TIME | RIGHT OR WRONG |
|---|---|---|
| j | t | RIGHT |

|  |  | RIGHT OR WRONG DETERMINATION RESULT | |
|---|---|---|---|
|  |  | RIGHT | WRONG |
| ACTUAL RIGHT OR WRONG | RIGHT | TP | FN |
|  | WRONG | FP | TN |

| SECTION | TIME | DETERMINATION RESULT |
|---|---|---|
| HIGH CLASSIFICATION PERFORMANCE | 1 | RIGHT |
| HIGH CLASSIFICATION PERFORMANCE | 2 | WRONG |
| HIGH CLASSIFICATION PERFORMANCE | 3 | RIGHT |
| HIGH CLASSIFICATION PERFORMANCE | ... | ... |
| HIGH CLASSIFICATION PERFORMANCE | 56 | WRONG |
| LOW CLASSIFICATION PERFORMANCE | 57 | RIGHT |
| LOW CLASSIFICATION PERFORMANCE | 58 | RIGHT |
| LOW CLASSIFICATION PERFORMANCE | 59 | RIGHT |
| LOW CLASSIFICATION PERFORMANCE | ... | RIGHT |
| LOW CLASSIFICATION PERFORMANCE | 100 | RIGHT |
| HIGH CLASSIFICATION PERFORMANCE | 101 | WRONG |
| HIGH CLASSIFICATION PERFORMANCE | 102 | WRONG |
| HIGH CLASSIFICATION PERFORMANCE | 103 | WRONG |
| HIGH CLASSIFICATION PERFORMANCE | ... | WRONG |
| HIGH CLASSIFICATION PERFORMANCE | 195 | WRONG |
| LOW CLASSIFICATION PERFORMANCE | 196 | RIGHT |

FIG. 17

INFORMATION PROCESSING APPARATUS, INFORMATION PROCESSING METHOD, AND COMPUTER PROGRAM

CROSS REFERENCE TO RELATED APPLICATIONS

This application is based upon and claims the benefit of priority from the prior Japanese Patent Application No. 2020-000550, filed on Jan. 6, 2020, the entire contents of which are incorporated herein by reference.

FIELD

Embodiments described herein relate to an information processing apparatus, an information processing method, and a computer program.

BACKGROUND

Several analysis systems for estimating a state of an observation target have been developed. For example, a sensor is set in the observation target and time-series data is acquired from the sensor. Training data is generated by allocating training labels of correct or incorrect answers to the time-series data. A state of the observation target is estimated based on the training data. However, in this method, only estimation for a state of the entire time-series data can be performed. Estimation for a state of a part of the time-series data cannot be performed.

BRIEF DESCRIPTION OF THE DRAWINGS

FIG. 3 is a diagram showing an example of time-series data acquired by a time-series-data acquirer;

FIG. 4 is a diagram showing a time-series data example stored in a time-series data DB;

FIG. 6 is diagrams showing a branch condition table and a model parameter table;

FIG. 17 is a diagram showing an example of a result of determination for time-series data including a plurality of times;

DETAILED DESCRIPTION

According to one embodiment, an information processing apparatus includes an estimator configured to estimate a state of an observation target on a first time, based on data on the first time included in time-series data obtained from the observation target.

Embodiments of the present invention will be explained below with reference to the drawings.

First Embodiment

Figure 1:
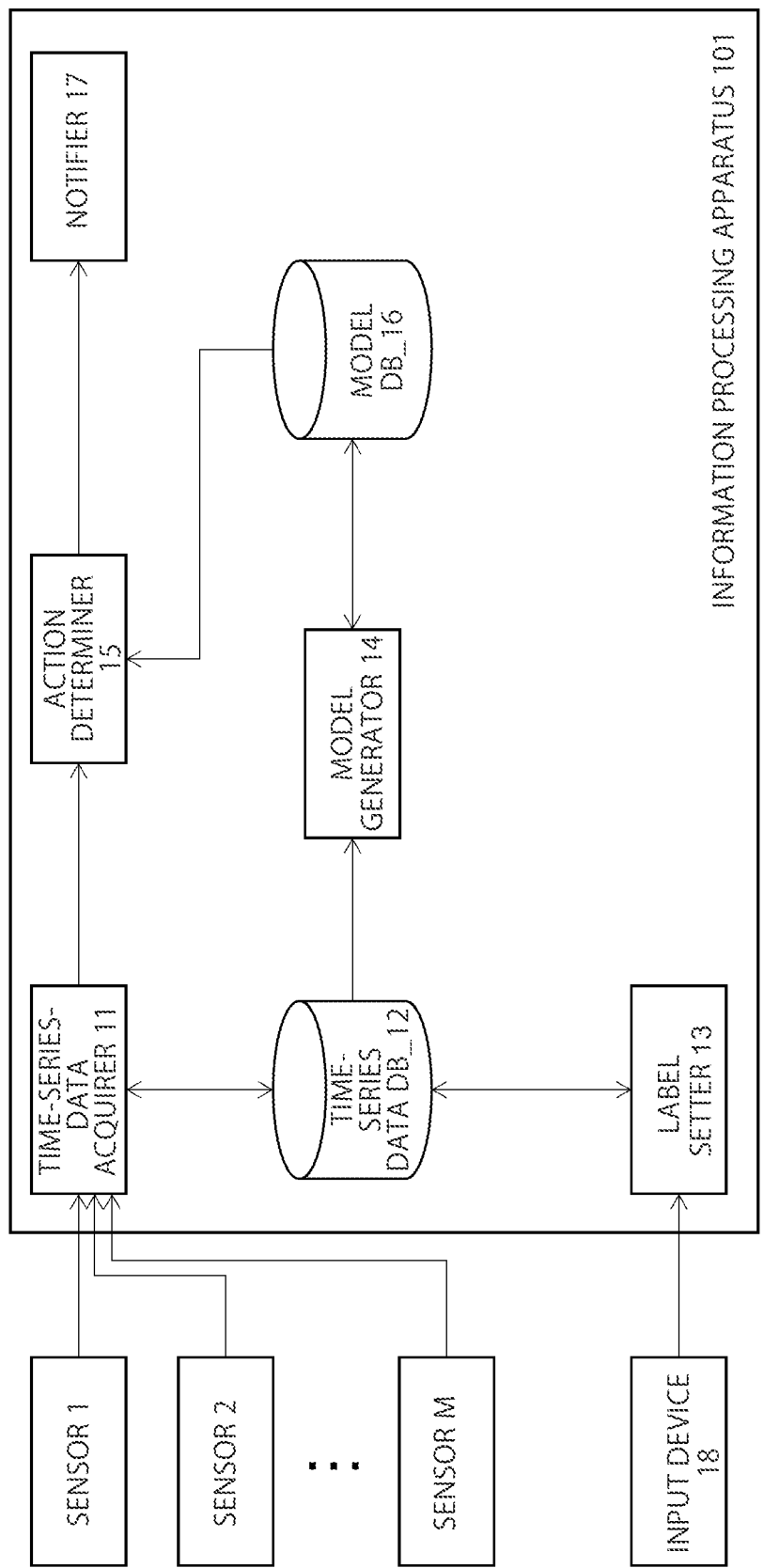
FIG. 1 is a block diagram of an information processing apparatus according to a first embodiment.

FIG. 1 is a block diagram of an information processing apparatus according to this embodiment. An information processing apparatus 101 shown in FIG. 1 is an apparatus that analyzes time-series data obtained from an observation target and estimates a state of the observation target at any time. Examples of the state of the observation target include a movement (an action) of a human, a mobile body, or the like and a movement (a change) in a demand amount such as a power demand amount. In this embodiment, it is assumed that a state at any time in an action of the observation target (the human, the mobile body, or the like) is estimated. As an example of estimating the state, a class of the state at any time is determined. Examples of the class include a first class (a correct answer class) in which a track of an action at any time is correct and a second class (an incorrect answer class) in which a track of an action at any time is wrong. Two classes are treated in this embodiment. However, the number of classes may be three or more. The determining the class of the state is only an example of the estimation of the state. The estimating state is not limited to the determining the class of the state. For example, the estimating the state may be selecting a relevant candidate out of a plurality of candidates of the state. The estimating the state may be predicting a state using a model of a neural network or the like.

In this embodiment, a class for the entire time-series data obtained from the observation target is not determined. A class is determined for any time of the time-series data. In some cases, even when it is determined that entire time-series data acquired from the observation target doing a certain action is wrong, a correction action portion and a wrong action portion are mixed. That is, even in time-series data of an action determined as wrong as a whole, an action corresponding to a part of the time-series data is sometimes correct. For example, it is conceived that an action for rehabilitation or technical training is performed. A track considered to be correct (a track serving as a model) is often present in the action of the rehabilitation. In the rehabilitation, functional recovery is achieved by repeatedly carrying out the correct action. In a situation without an instructor, a rehabilitation practitioner sometimes performs a wrong action. However, when an action wrong as a whole is partially seen, a correct action is sometimes performed. This embodiment makes it possible to highly accurately determine whether for time-series data of an action serving as an evaluation target, the action is a correct action (a correct state) or a wrong action (an wrong state) at every time.

FIGS. 2A and 2B show an example of time-series data of a correct action and time-series data of an incorrect action. More specifically, FIG. 2A shows time-series data of an action determined as correct by a user of the information processing apparatus 101 (for example, an observer of the observation target). FIG. 2B shows time-series data of an action determined as incorrect by the user of the information processing apparatus 101. The time-series data shown in FIG. 2B has an incorrect waveform as a whole but includes a waveform same as or similar to the time-series data of the correct action as well. For example, the waveform shown in FIG. 2B is different from a waveform shown in FIG. 2A at P-th second from an action start to Q-th second and R-th second to S-th second. On the other hand, the waveform shown in FIG. 2B is the same as the waveform shown in FIG. 2A until P-th second from an action start, at Q-th second to R-th second and S-th second and subsequent seconds. The P-th second, the Q-th second, the R-th second, and the S-th second are boundaries between the waveform of the correct action and the waveform of the wrong action.

In this embodiment, times serving as boundary are determined and a classification model for each of time sections divided by the times is generated using, as learning modes, a plurality of time-series data to which correct or incorrect answer labels are allocated as training labels. The classification model is a model for determining right or wrong of an action.

Right or wrong determination is performed for each time concerning time-series data serving as an evaluation target using the classification model for each of the time sections as an evaluation mode. More specifically, the right or wrong determination using the classification model is performed concerning a time section in which a classification model having identification performance equal to or higher than a threshold is obtained. The right or wrong determination using the classification model is not performed concerning a time section in which a classification model having identification performance lower than the threshold is obtained. For example, it is assumed that, since data of an incorrect (wrong) action is absent or less at Q-th second to R-th second, the classification model having the identification performance equal to or higher than the threshold cannot be obtained. The right or wrong determination is not carried out for time belonging to such a time section having the low identification performance. Consequently, highly accurate determination is performed, right or wrong determination for all points of the time-series data is avoided, and the number of times of calculation is reduced. This embodiment is explained in detail below.

The information processing apparatus 101 includes a time-series-data acquirer (a data acquirer) 11, a time-series data DB_12, a label setter 13, a model generator 14, an action determiner (an estimator) 15, a model DB_16, and a notifier 17.

The time-series-data acquirer 11 functions as a data acquirer and acquires time-series data, which is a time series of a feature value, detected by M sensor devices 1, 2, ..., M ("M" is an integer equal to or larger than 1). The sensor devices 1 to M include, as an example, a sensor set in the observation target. The observation target may be a human, may be a mobile body such as an automatic guided vehicle (AGV), or may be an apparatus such as a smart meter.

Examples of the sensor include a speed sensor, an acceleration sensor, a position sensor, a temperature sensor, a magnetism sensor, a power sensor, a voltage sensor, and a current sensor. The sensor may be sensors of other types. The feature value may be a value detected by the sensor. The feature value may be a statistical value (an averages, a variance, or the like) of the value detected by the sensor. The feature value may be an arithmetic operation value of values detected by a plurality of sensors. For example, the feature value may be a product of a current value detected by the current sensor and a voltage value detected by the voltage sensor. In this case, the sensor device may be an arithmetic operation apparatus such as a CPU.

The time-series data DB_12 stores the time-series data acquired by the time-series-data acquirer 11. The time-series data DB_12 stores, in association with time, the time-series data acquired by the time-series-data acquirer 11.

FIG. 3 shows an example of the time-series data acquired by the time-series-data acquirer 11. Time-series data at time "t" is indicated. The time-series data is acquired in the same form concerning other timers. In this example, accelerations in each of an X axis, a Y axis, and a Z axis, angular velocity in each of the X axis, the Y axis, and the Z axis, intensity of terrestrial magnetism on each of the X axis, the Y axis, and the Z axis, and the like are acquired as feature values.

Information about a class concerning an action of the observation target is input from an input device 18 as a training label with respect to the time-series data acquired by the sensor devices 1 to M or the time-series data stored in the time-series data DB_12.

For example, the user of the information processing apparatus 101 observes the action of the observation target and, after the action of the observation target ends, determines whether the observation target performs a correct action. If determining that the observation target performs the correct action, the user inputs a training label (a training label of a correct answer) indicating an "action is correct" class. If determining that the observation target performs an incorrect action, the user inputs a training label (a training label of an incorrect answer) indicating an "action is wrong" class. The correct action is considered a normal action or an as-expected action. The incorrect action is considered an abnormal action or an unexpected action.

For example, when the observation target performs rehabilitation and an action of the rehabilitation is correct (when the observation target performs an action as instructed by the instructor), the user inputs the training label of the correct answer. Otherwise, the user inputs a negative training label. As another example, when the AGV travels on a predetermined route, the user inputs the training label of the correct answer. Otherwise, the user inputs the negative training label.

The label setter 13 stores the training label input from the input device 18 in the time-series data DB_12 in association with time-series data designated by the user. The time-series-data acquirer 11 may generate identification information (an action ID) for identifying an action of the observation target and store the identification information in the time-series data DB_12 in association with the time-series data. Note that the user may designate the action ID from the input device 18.

FIG. 4 shows a time-series data example stored in the time-series data DB_12. Action IDs, times, and training labels (right/wrong) are associated with data acquired at times. "Right" corresponds to the training label of the correct answer. "Wrong" corresponds to the training label of the incorrect answer.

The same action ID and the same training label are allocated to data of time-series data including data at a plurality of times.

The respective data included in the time-series data are arranged in time order. For example, N data, an action ID of which is 1, are present. A set of the N data corresponds to time-series data representing the same action. One row (data at one time) corresponds to one record. N data also present concerning an action ID 2. The same holds true concerning an action ID 3 and subsequent action IDs.

Times of time-series data with action IDs=1, 2, 3, . . . are relative times. In this example, all the times start from time 1. However, the times of the time-series data may be represented by absolute times.

In the example shown in FIG. 4, the numbers of records (the numbers of data) included in time-series data are the same. However, the number of records (the number of data) included in time-series data may be different for each of actions.

In the example shown in FIG. 4, a sampling interval for a record (data) is the same for each of the actions. However, the sampling interval may be different.

In this embodiment, the label setter 13 acquires a training label from the input device 18 and allocates the acquired training label. However, another apparatus may perform acquisition of time-series data, setting of a training label, and the like. In this case, the information processing apparatus 101 may acquire the time-series data, to which the training label and the like are allocated, from the other apparatus and store the acquired time-series data in the time-series data DB_12.

The model generator 14 generates a model tree using, as learning data, the time-series data with the training label stored in the time-series data DB_12. The model tree is for determining, based on time of data serving as an evaluation target in time-series data serving as an evaluation target, a classification model used for evaluating a class (a correct answer/an incorrect answer) of the data serving as the evaluation target. The model tree is a type of a determination tree and is a determination tree, to a leaf node of which a classification model is associated. The classification model is for determining the class (the correct answer/the incorrect answer) of the data serving as the evaluation target. The classification data is a model in which the data serving as the evaluation target and a value for determining right or wrong of an action (a value for determining a class) are associated. The model generator 14 stores the generated model tree in the model DB_16.

Figure 5:
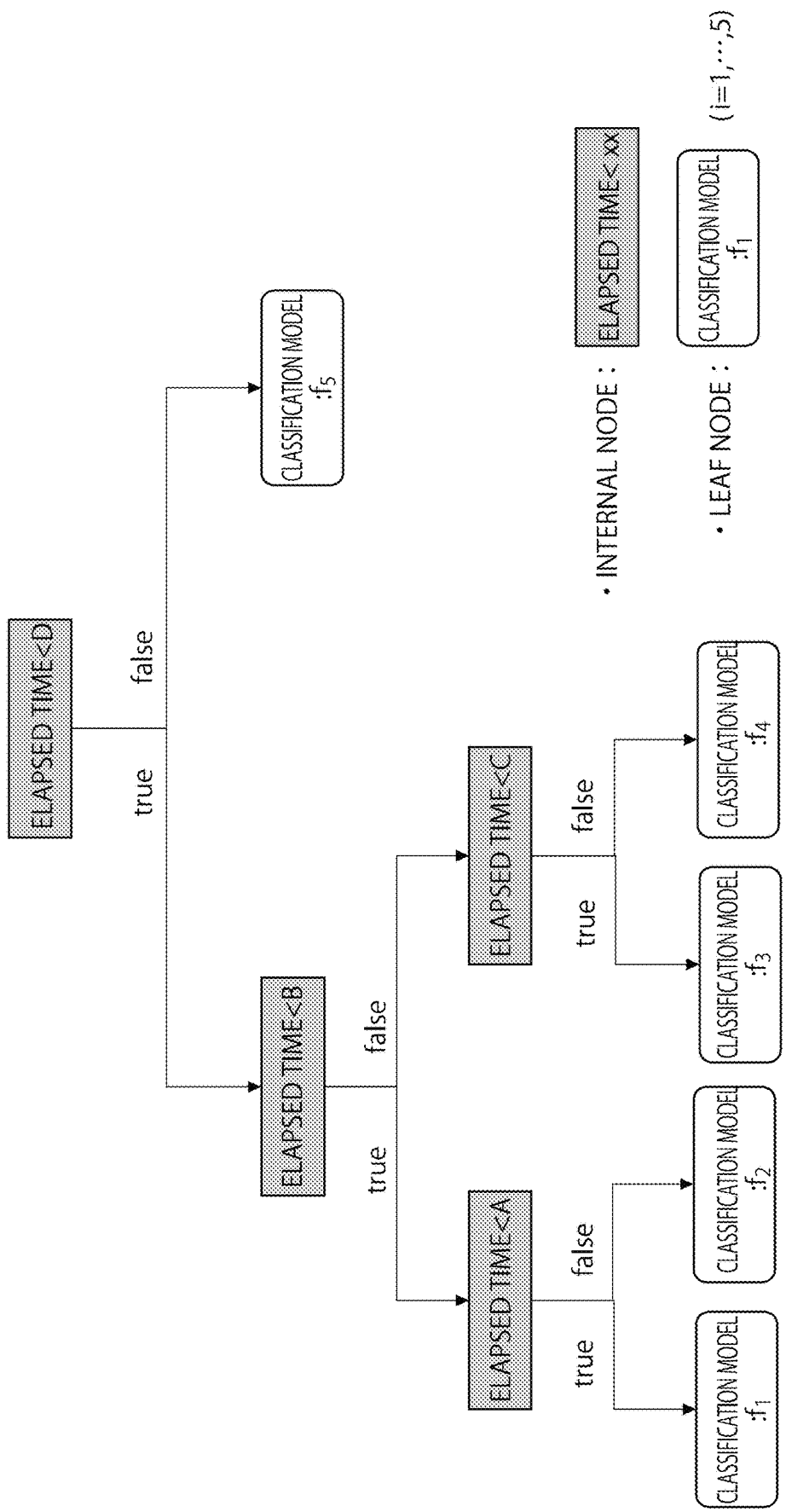
FIG. 5 is a diagram schematically showing the structure of a model tree.

FIG. 5 schematically shows the structure of the model tree. The model tree includes a plurality of nodes and an arc indicating a relation among the nodes. The nodes include internal nodes and end nodes (leaf nodes). The internal nodes are nodes (a root node and a halfway node) having other nodes at branching destinations. The leaf nodes are nodes that do not further branch. The branch conditions are allocated to the internal nodes. Classification models (identifiers) are associated with the leaf nodes. A node at a branching destination from a certain node is referred to as child node of the node. The node is referred to as a parent node of the child node.

A branch condition is a condition concerning time. Specifically, the branch condition is defined by an inequality based on times for dividing a waveform of time-series data into a plurality of time sections. As an example, the branch condition is defined using an elapsed time from start time of an action. For example, "elapsed time <12 seconds" (the elapsed time is less than 12 seconds), "elapsed time <43 seconds", and the like correspond to the branch condition.

A classification model $f_i$ (i=1, . . . , S) (S is the number of leaf nodes) is associated with the leaf nodes. The classification model is a model for performing right or wrong determination of data at certain one time (a set $x^{(t)}$ (t=1, . . . , T) of feature values) in time-series data. Such a model can be generated using logistic regression, a naive Bayes classifier, a neural network, deep learning, a random forest, boosting, or the like, which is a general machine learning method.

The classification model $f_i$ in the leaf nodes is generated using, as an example, the same method of machine learning. When a sparse modeling method, a stepwise method, or the like represented by a LASSO (least absolute shrinkage and selection operator) is used as the learning method for the classification model, variable selection is performed. Consequently, it is also likely that a variable (a feature value) used for the classification model is different for each model. In general, the classification model can be represented by the following equation.

[Math 1]

$$y^{(t)} = f_i(x^{(t)}) \qquad (1)$$

"fi" is a function representing the classification model.

"$x^{(t)}$ (t=1, . . . , T)" is a vector including values (feature values) of the sensor devices at time "t". That is, $x^{(t)} = (x_1^{(t)}, x_2^{(t)}, \ldots, x_l^{(t)}, \ldots, x_L^{(t)})$ is satisfied. "$x_l^{(t)}$" indicates a feature value of a sensor device (an l-th sensor device) at the time "t". "L" is the number of feature values.

"$y^{(t)}$ (t=1, . . . , T)" is information for specifying a correct answer (right) or an incorrect answer (wrong) of an action serving as an evaluation target. In this embodiment, a correct action is represented by 1 and an incorrect action is represented by 0 but may be opposite. During leaning of a classification model, in time-series data concerning a certain action, the same training label is allocated at all times. Therefore, "$y^{(t)}$" takes the same value in all of times 1, . . . , T. On the other hand, when time-series data serving as an evaluation target is evaluated using a learned classification model, "u(t)" takes a value of 0 or 1 at every time "t".

FIG. 6 represents, in a table format, a model tree generated by the model generator 14. FIG. 6 shows a branch condition table. FIG. 6 shows a model parameter table. The branch condition table represents the structure of the model tree. The model parameter table stores parameters of classification models and identification performance of the classification models associated with leaf nodes of the model tree. It is assumed that forms of functions of the classification models are separately stored in the model DB_16.

The branch condition table shown in FIG. 6 includes the following items.

Node ID: An ID for identifying a node of the model tree.

Note type: A value indicating whether a node indicated by the node ID is a leaf node or an internal node. Concerning a root node among internal nodes, the node type has a value indicating the root node.

Threshold: When the node type indicates the internal node, time used as a threshold in a branch condition. When the node type indicates the leaf node, the threshold is "NA".

Model ID: When the node type indicates the leaf node, an ID of a model associated with the relevant leaf node. When the node type indicates the internal node, the model ID is "NA".

Node ID on the left side: When the node type indicates the internal node, a node ID of the next node to proceed to when a branch condition for the relevant internal node is true. When the node type is the leaf node, the node ID on the left side is "NA".

Node ID on the right side: When the node type indicates the internal node, a node ID of the next node to proceed to when a branch condition for the relevant internal node is false. When the node type indicates the leaf node, the node ID on the right side is "NA".

The model parameter table shown in FIG. 6 includes the following items.

Model ID: An ID for identifying a classification model associated with a leaf node.

Model parameters 1 to F: Values of F model parameters of the classification model. When variable selection is carried out by the model generator 14, an unselected variable (a deleted variable) has a value of 0.

Identification performance: Identification performance indicates whether identification performance of the classification model is high or low (whether right or wrong determination using the classification model is performed or not). The identification performance being high means that an indicator for evaluating the identification performance of the classification model is equal to or larger than a threshold. In this embodiment, when the identification performance is high, the right or wrong determination using the classification model is performed. The identification performance being low means that the indicator for evaluating the identification performance of the classification model is smaller than the threshold. In this embodiment, when the identification performance is low, the right or wrong determination using the classification model is not performed. In this case, for example, a determination result of "correct" (a correct answer) or "undetermined" is output (details are explained below).

Details of operation of the model generator 14 for generating a model tree are explained below.

The action determiner (a decider) 15 estimates, for the time-series data serving as the evaluation target obtained by the time-series-data acquirer 11, a state of the observation target at time "p" (p=1, . . . , T) based on the model tree stored in the model DB_16 and information for specifying a time section to which the time "p" (p=1, . . . , T) belongs. That is, the action determiner 15 performs right or wrong determination for the state (an action or the like) of the observation target at the time "p". An overview of the operation of the action determiner 15 is explained with reference to FIG. 7.

Figure 2:
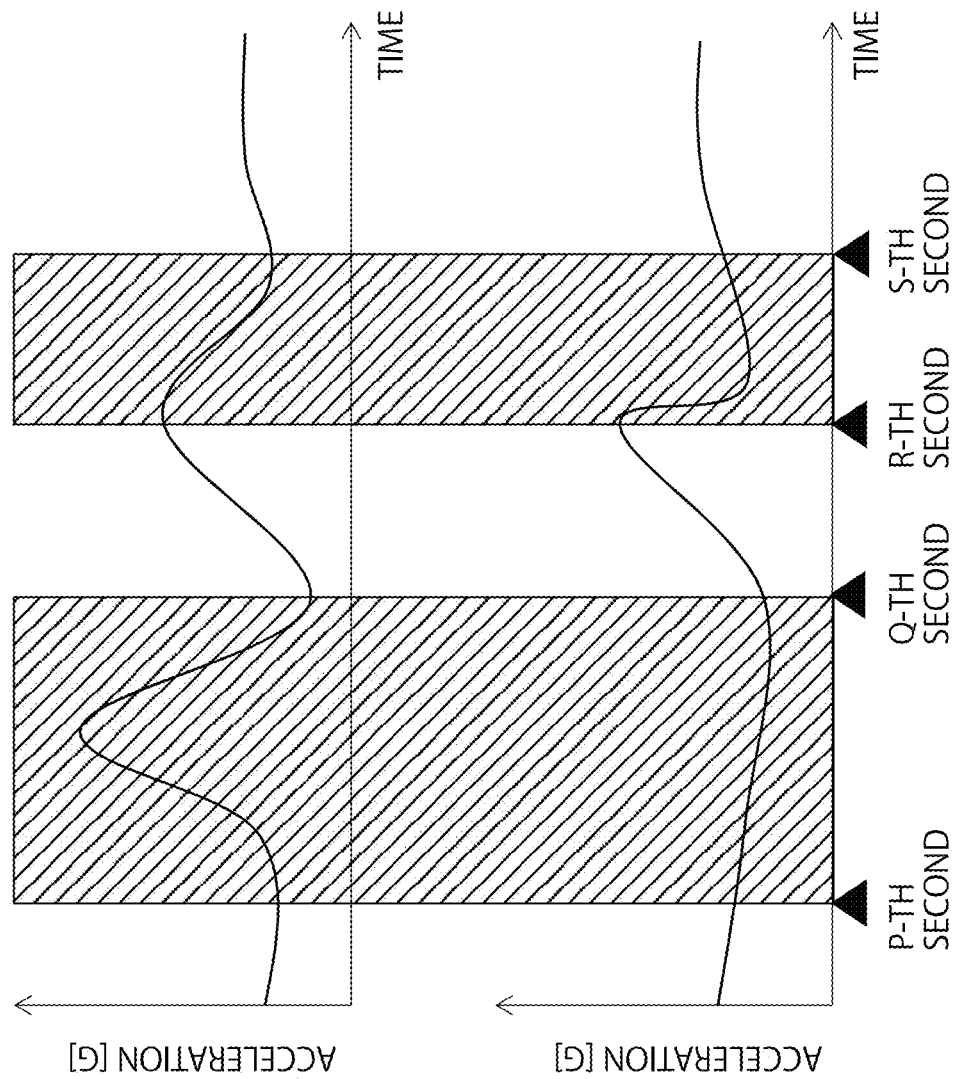
FIGS. 2A and 2B are diagrams showing an example of time-series data of a correct action and time-series data of an incorrect action.
Figure 7:
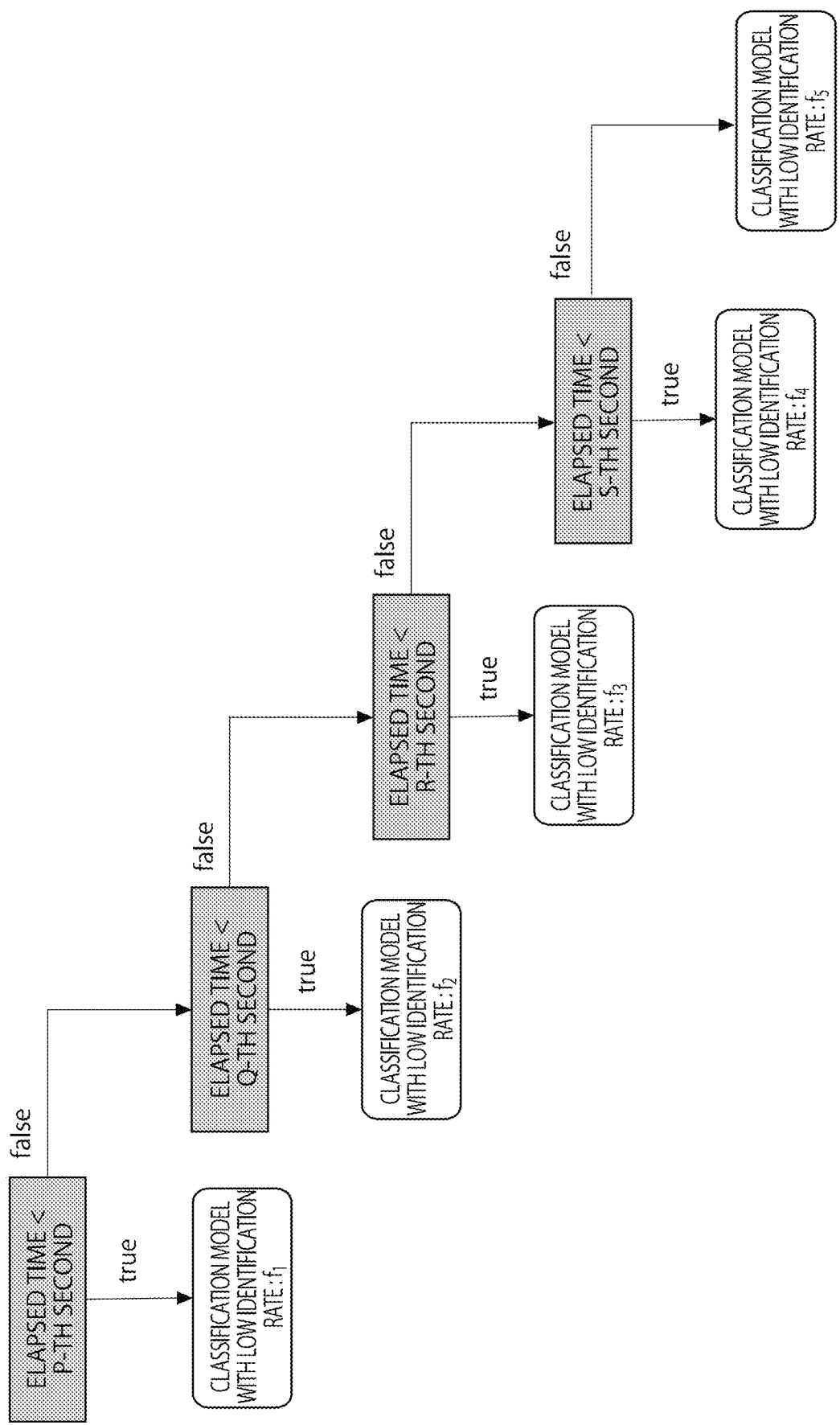
FIG. 7 is a diagram showing a specific example of the model tree.

FIG. 7 shows an example of a model tree generated when the times P, Q, R, and S shown in FIG. 2 is used as boundary times.

A classification model $f_1$ having a low identification rate is associated with a leaf node corresponding to a time section of less than P-th second.

A classification model $f_2$ having a high identification rate is associated with a leaf node corresponding to a time section of P-th second or more and less than Q-th second.

A classification model $f_3$ having a low identification rate is associated with a leaf node corresponding to a time section of Q-th second or more and less than R-th second.

A classification model $f_4$ having a high identification rate is associated with a leaf node corresponding to a time section of R-th second or more and less than S-th second.

A classification model $f_5$ having a low identification rate is associated with a leaf node corresponding to a time section of S-th second or more.

In the case of this model tree, the action determiner 15 does not perform the right or wrong determination in a time section before P-th second of the time-series data serving as the evaluation target. That is, the action determiner 15 does not perform determination using the classification model $f_1$. In this case, the action determiner 15 outputs, for example, a determination result of "correct" (a correct answer) or "undetermined".

In the time section of P-th second or more and less than Q-th second of the time-series data serving as the evaluation target, the action determiner 15 performs determination using the classification model $f_2$. In this case, the action determiner 15 outputs a result of the right or wrong determination based on the classification model $f_2$. The action determiner 15 does not perform the right or wrong determination in the time section of Q-th second or more and less than R-th second of the time-series data serving as the evaluation target. That is, the action determiner 15 does not perform determination using the classification model $f_3$. In this case, the action determiner 15 outputs, for example, a determination result of "correct" (a correct answer) or "undetermined".

In the time section of R-th second or more and less than S-th second of the time-series data serving as the evaluation target, the action determiner 15 performs determination using the classification model $f_4$. In this case, the action determiner 15 outputs a result of the right or wrong determination based on the classification model $f_4$. The action determiner 15 does not perform the right or wrong determination in the time section of S-th second or more of the time-series data serving as the evaluation target. That is, the action determiner 15 does not perform determination using the classification model $f_5$. In this case, the action determiner 15 outputs, for example, a determination result of "correct" (a correct answer) or "undetermined".

The notifier 17 transmits output data including the result of the right or wrong determination for the action at the time "p" determined in the action determiner 15 to a predesignated apparatus. Examples of the predesignated apparatus include the observation target itself (for example, a mobile body such as an AGV or a drone), a management apparatus that manages the observation target, and an apparatus held by the observation target (for example, an apparatus held by a human). Alternatively, the predesignated apparatus may be a terminal held by the user, a server, or the like.

Figures 8, 9:
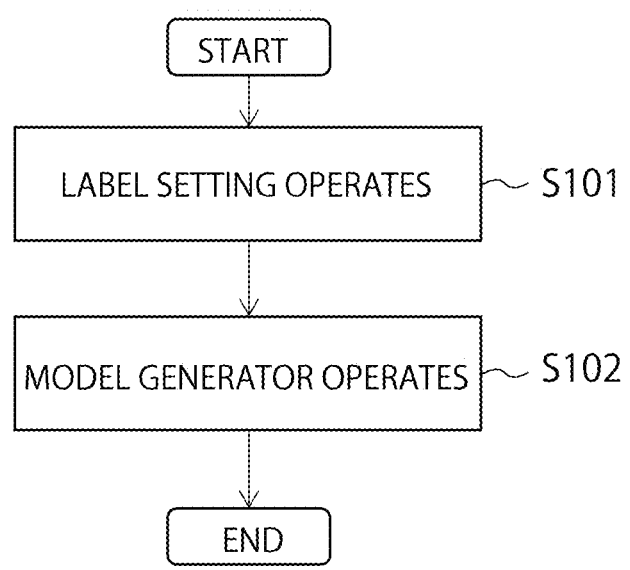
FIG. 8 is a diagram showing an example of output data transmitted by a notifier.
FIG. 9 is a diagram showing an overall flow of operation in a learning mode according to a first embodiment.

FIG. 8 shows an example of the output data transmitted by the notifier 17. The output data shown in FIG. 8 includes an action ID, time, and a right or wrong determination result.

FIG. 9 shows an overall flow of an operation in the learning mode according to this embodiment. It is assumed that time-series data, to which an action ID is allocated in advance, is stored in the time-series data DB_12.

In step S101, the label setter 13 acquires, via the input device 18, a training label (a label having two values of a correct answer and an incorrect answer) input by the user. The label setter 13 associates the acquired training label with the corresponding time-series data. The time-series data, to which the training label and the action ID are allocated, corresponds to learning data. A set of the learning data corresponds to the learning table (see FIG. 4 referred to above).

In step S102, the model generator 14 acquires the learning data (M learning data in the case in which M sensor devices are present) from the time-series data DB_12. The model generator 14 generates a model tree using the acquired learning data. The model generator 14 stores the generated model tree in the model DB_16.

Figure 10:
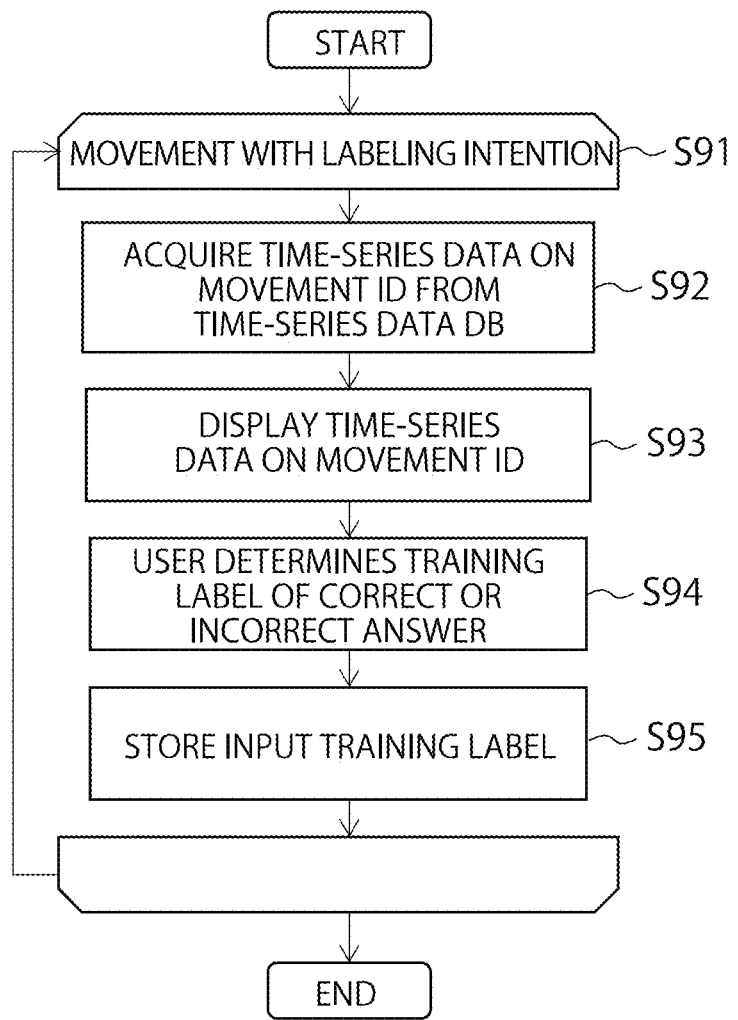
FIG. 10 is a diagram showing a detailed flow of a label setter.

FIG. 10 shows a detailed flow of the label setter 13 performed in step S101 in FIG. 9.

In step S91, the label setter 13 specifies an action ID of an action to which the user desires to attach a training label. The user may designate the action ID. The label setter 13 may optionally specify time-series data to which a training label is not attached yet.

In step S92, the label setter 13 acquires, from the time-series data DB_12, time-series data corresponding to the specified action ID.

In step S93, the label setter 13 displays the acquired time-series data on a display device.

In step S94, the user determines a training label of a correct answer (right) or an incorrect answer (wrong) and inputs the training label using the input device 18. The user observes an action of the observation target at the time when the time-series data on the action ID is detected by the sensor device and determines a training label based on the observation. Alternatively, the user may view a waveform of the time-series data and determine a training label.

In step S95, the label setter 13 associates the training label input from the input device 18 with the time-series data concerning the action ID.

The label setter 13 may carry out a preprocess for the time-series data. For example, the label setter 13 may convert three values of the X axis, the Y axis, and the Z axis into a Euclidean distance or the like. Alternatively, the label setter 13 may perform main component conversion on the three values of the X axis, the Y axis, and the Z axis. Alternatively, the label setter 13 may calculate a moving average of the values of the axes. Besides, a general preprocessing method for the time-series data is applicable.

Figure 11:
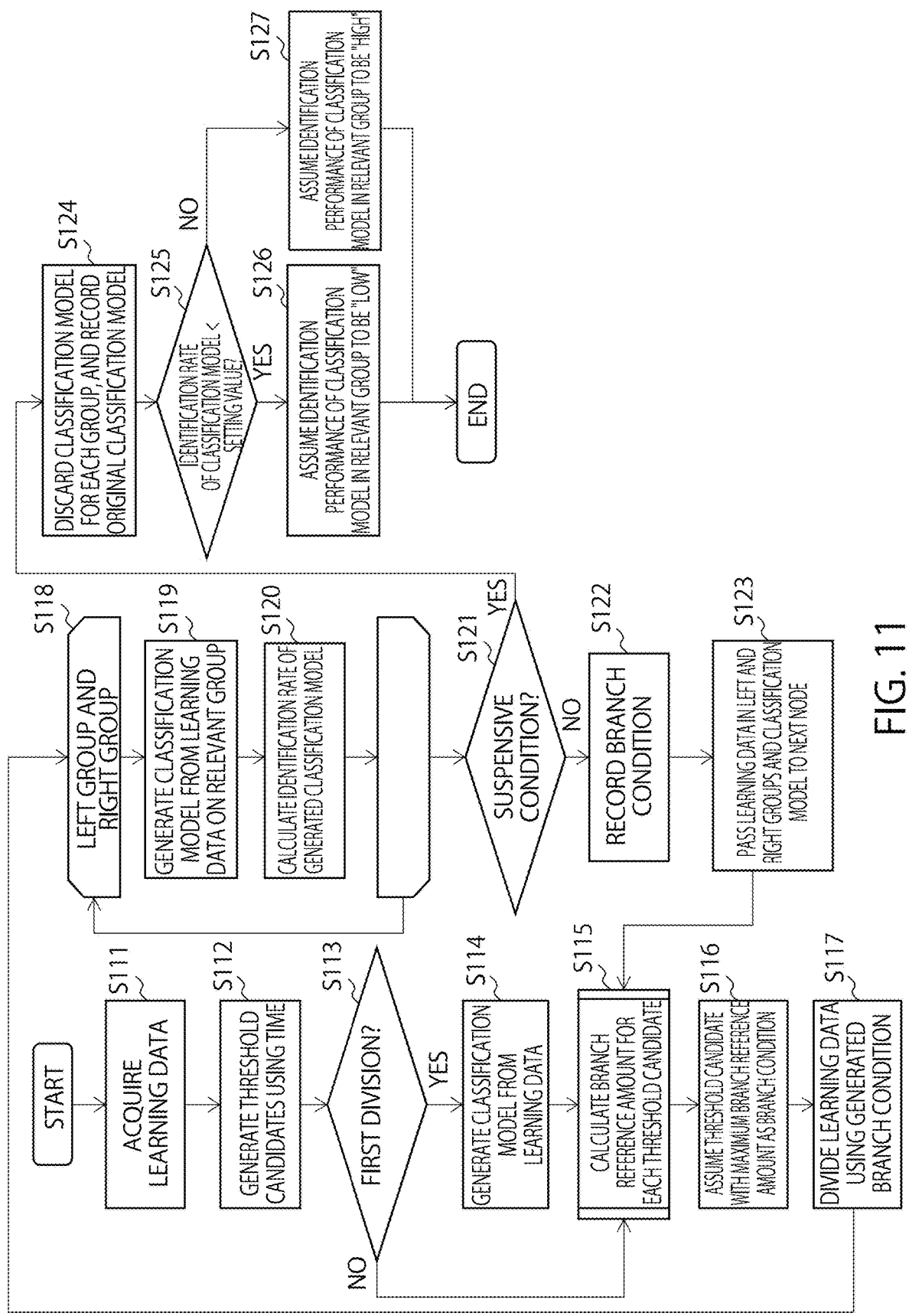
FIG. 11 is a diagram showing a detailed operation flow of a model generator.

FIG. 11 shows a detailed operation flow of the model generator 14 performed in step S102 in FIG. 9. In the flow shown in FIG. 11, it is assumed that all learning data are collected in advance in the time-series data DB_12. Note that, when a generated model tree is updated, relearning may be performed in full scratch. In the following explanation, a target node for which a branch condition is generated is referred to as "generation node".

In step S111, the model generator 14 acquires time-series data for a plurality of motions (that is, learning data (records) at a plurality of times concerning each of the plurality of actions) as a learning table from the time-series data DB_12. The model generator 14 specifies all times including in a column of time of the learning table. If overlapping times are present, the model generator 14 eliminates the overlap. When the same time is included in a plurality of learning data of the actions, if all the times are specified from learning data of one operation, a time column without overlap is obtained.

In step S112, the specified times are sorted in an descending order (or an ascending order). Sorted times are assumed as $$\acute{x} = \{\acute{x}_1, \acute{x}_2, \ldots, \acute{x}_H\}$$

("H" is total number of times without overlap). According to any of the following methods (A) and (B), candidates of thresholds used as the branch condition are calculated.

$$\text{average: candidate of threshold} := \frac{\acute{x}_i' + \acute{x}_{i+1}'}{2}$$

$$\text{moving average: candidate of threshold} = \frac{\acute{x}_d' + \ldots + \acute{x}_{d+h}'}{1+h}$$

("d" can be freely set)

Note that "x'" can be used, as it is, as a candidate of a threshold.

In step S113, it is determined whether first division is performed. That is, it is determined whether the node to be generated this time is a root node or not. If the node is a root node (a case of first division), the processing proceeds to step S114. If the node is not a root node, the processing proceeds to step S115.

In step S114, a column of feature value on the learning table is extracted as explanatory variables, a column of (right or wrong) training labels (see FIG. 4) is extracted as objective variables, and the variables are assumed as data for model generation. Based on the data for model generation, a classification model that predicts the objective variable from the explanatory variable is generated. Furthermore, the identification rate of the classification model is calculated. The details of an identification rate calculation method is described later. A node ID is issued, and a root node is generated as a generation node.

In step S115, the learning table, and the classification model for the generation node are used to calculate the branch reference amount for every threshold candidate. Note that the details of the branch reference amount are described later.

In step S116, the threshold candidate with the maximum branch reference amount is assumed as the threshold of the branch condition at the generation node.

In step S117, the branch condition generated in step S116 is applied to the column of time of the learning table. Division is performed into a left-group (time <threshold) learning table and a right-group (time >=threshold) learning table. A node ID is issued for the left group, and a node ID is issued for the right group. A node of the left group, and a node of the right group are generated.

In step S118, the processes of following steps S119 and S120 are executed for each of the left group and the right group.

In step S119, a column of feature value on the learning table of the relevant group is extracted as explanatory variables, a column of (right or wrong) training labels is extracted as objective variables, and the data for model generation is generated. Based on the data for model generation, a classification model that predicts the objective variable from the explanatory variable is generated.

In step S120, the identification rate of the classification model generated for the relevant group is calculated. The details of an identification rate calculation method is described later.

In step S121, it is determined whether a suspensive condition is satisfied. More specifically, it is determined whether the current target nodes (the left node and the right node generated in step S107) satisfy the suspensive condition. The suspensive condition is a condition for determining whether division of the left node and the right node is performed. If the suspensive condition is satisfied, the processing proceeds to step S124. If not satisfied, processing proceeds to step S122.

Three examples of the suspensive conditions are described as the following (A) to (C). "β" is a preset parameter.

(A) Use identification rate. For example, if the difference between the identification rate before division and the average of the identification rates of the two divided groups after division is less than a preset value, it is determined that the suspensive condition is satisfied.

(B) Use the number of divisions. For example, if the number of divisions is larger than a preset value, it is determined that the suspensive condition is satisfied.

(C) Use the number of learning data in the group. For example, if the number of learning data belonging to the left group (left node) or the right group (right node) is less than a preset value, it is determined that the suspensive condition is satisfied.

In step S122, the node ID of the generation node, the node type, the threshold, the left node ID, and the right node ID are stored in the branch condition table (see FIG. 6). When step S122 is executed at the first time, the node type is "root".

In step S123, the node in the left group is assumed as the generation node. The learning table of the left group and the classification model of the left group are used to execute step S115 for the generation node in the left group. Likewise, the node in the right group is assumed as the generation node. The learning table of the right group and the classification model of the right group are used to execute step S115 for the generation node in the right group. Hereinafter, for the generation node of the left group and the generation node of the right group, the processes similar to those in the case where the generation node described above is the root node, are repeated.

In step S124, the classification model generated for the left group and the classification model generated for the right group are discarded. A model ID is issued for the classification model generated for the generation node (the parent node based on which the node of the left group and the node of the right group, to be discarded, are generated by division). The issued model ID and the parameter of the classification model are stored in the model parameter table (see FIG. 6). That is, in step S124, the leaf node of the model tree is determined, and the classification model associated with the leaf node is determined.

In step S125, it is determined whether the identification rate of the classification model with each model ID is smaller than a preset setting value. If the rate is smaller than the setting value, the processing proceeds to step S126. If the rate is larger than the setting value, the processing proceeds to step S127.

In step S126, "low" (the right or wrong determination using the classification model with this model ID is not performed) is recorded in the identification performance of the relevant model ID.

In step S127, "high" (the right or wrong determination using the classification model with this model ID is performed) is recorded in the identification performance of the relevant model ID.

Figure 12:
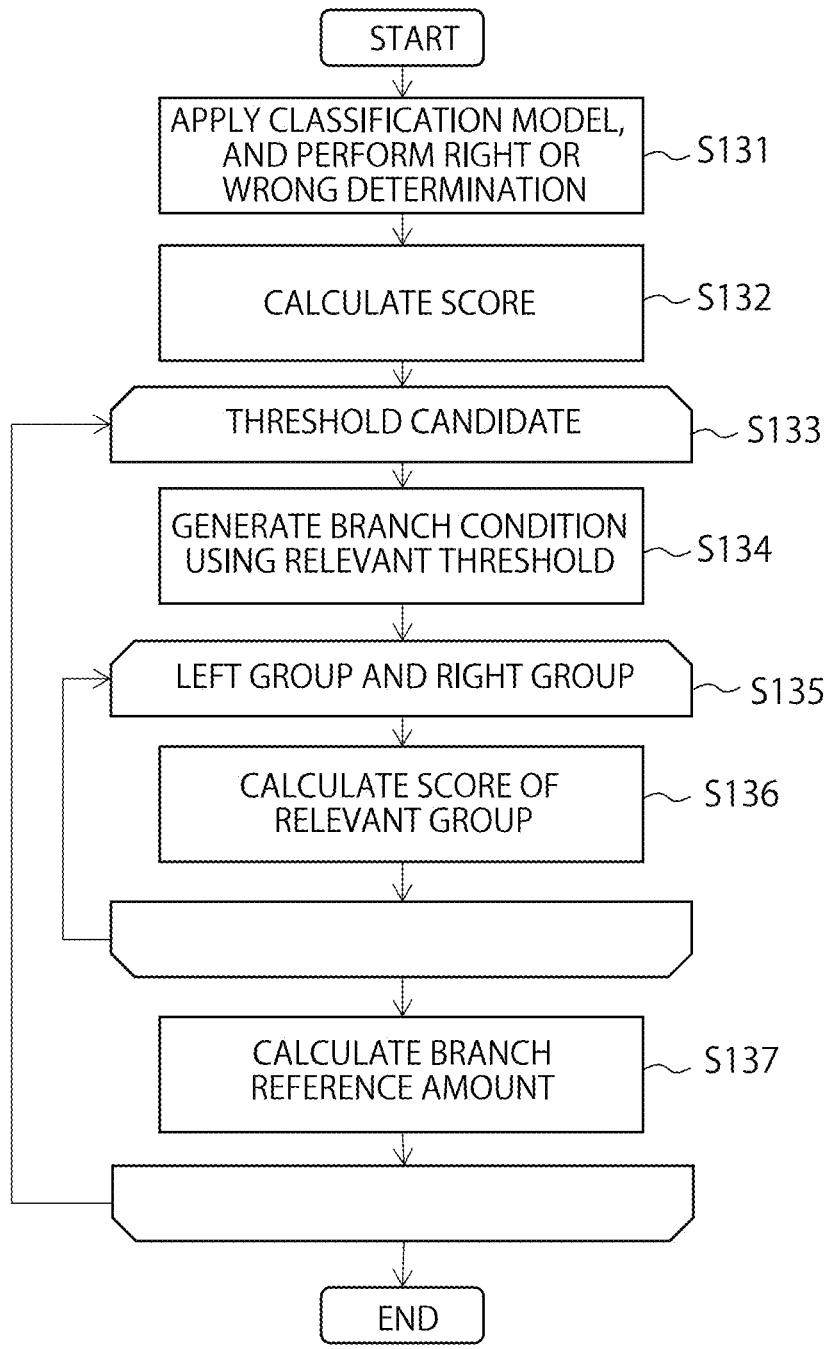
FIG. 12 is a diagram showing a detailed flow of a calculation method for a branch reference amount.

FIG. 12 shows a detailed flow of a calculation method for the branch reference amount performed in step S115 in FIG. 11. The record in this explanation indicates data of a certain action on the learning table at a certain time (that is, corresponding to one row of the learning table).

In step S131, the learning table belonging to the generation node (in the case of the root node, the entire learning data (all the records) acquired in S111) is applied to the classification model, and the right or wrong determination is performed. The result of the right or wrong determination and an actual right or wrong result (the training label of the record) are compared with each other, and the number of records (the number of records with incorrect answers) where the right or wrong determination result is different from the actual right or wrong result is calculated.

In step S132, the score for the generation node is calculated. Examples of scores are described below as (A), (B) and (C).

$$\text{minority ratio} = \frac{\text{the larger one of the numbers of correct and incorrect records}}{\text{the number of records on the learning table}} \quad (A)$$

$$\text{error determination ratio (incorrect answer ratio)} = \quad (B)$$
$$\frac{\text{the numbers of incorrect records}}{\text{the number of records on the learning table}}$$

$$\text{the time - specific correct answer ratio} = \quad (C)$$
$$\frac{\text{the number of correct records at a certain time}}{\text{the number of records on the learning table at a certain time}}$$

In step S133, following steps S134 to S137 are repeated multiple times that is equal to the number of threshold candidates.

In step S134, the branch condition is generated with the threshold candidate. The generated branch condition is applied to the time column of the learning table belonging to the generation node. Division is performed into a left-group (time <threshold) learning table and a right-group (time >=threshold) learning table.

For step S135, step S136 is executed for each of the left group and the right group.

In step S136, the learning table of the left group is used to calculate the score according to the same method as that in step S132. The learning table of the right group is used to calculate the score according to the same method as that in step S132.

In step S137, the branch reference amount is calculated according to the following reference.

$$\text{branch reference amount} := \text{score of group before division} -$$
$$\frac{(\text{score of left group} + \text{score of right group})}{2}$$

The following can also be used for the branch reference amount.

branch reference amount:=|score of left group−score of right group|

Figures 13, 14:
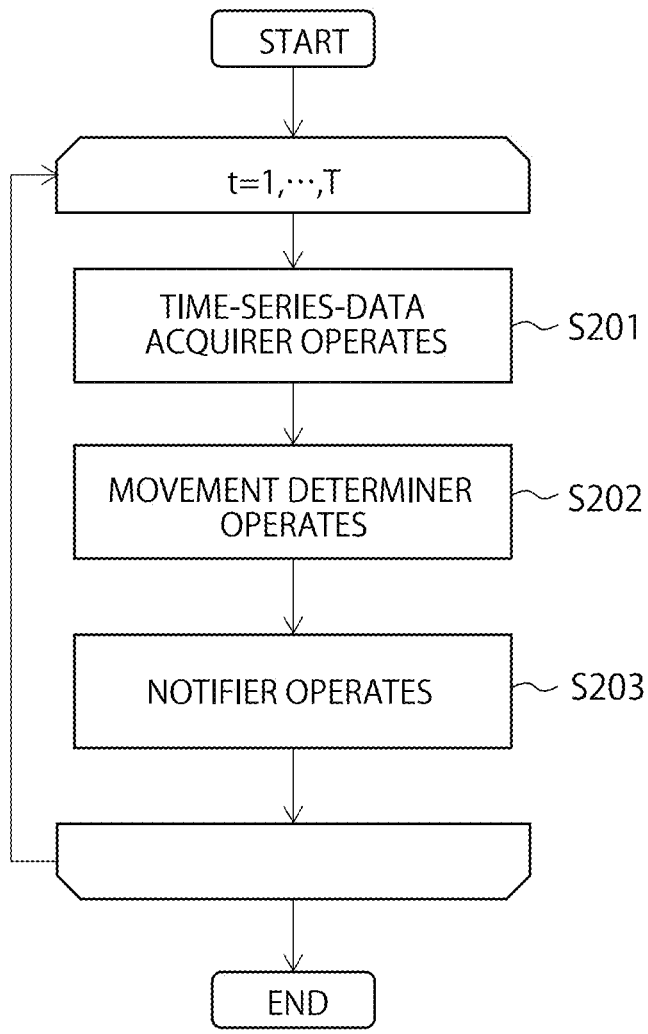
FIG. 13 is a diagram showing a mixing matrix used for calculation of an identification rate.
FIG. 14 is a diagram showing an overall flow of operation in an evaluation mode according to the first embodiment.

FIG. 13 shows a mixing matrix used for calculation of the identification rate in step S120 in FIG. 11. TP is true positive. FP is false positive. FN is false negative. TN is true negative. The mixing matrix is counts of the number of records for each combination of an actual right or wrong result and a right or wrong determination result for a certain action at a certain time on the learning table. As the identification rate, any of the followings (A) to (D) can be used. Each of (A) to (D) corresponds to a relationship where the higher the value is, the higher the identification rate is (the higher the identification performance is).

$$\text{correct answer ratio} = \frac{TP + TN}{TP + FP + TN + FN} \quad (A)$$

$$\text{true positive ratio} = \frac{TP}{TP + FN} \quad (B)$$

$$\text{true negative ratio} = \frac{TN}{FP + TN} \quad (C)$$

$$\text{accuracy} = \frac{TP}{TP + FP} \quad (D)$$

FIG. 14 is a diagram showing an overall flow of operation in an evaluation mode according to this embodiment. Hereinafter, the operation at time "t" is explained.

In step S201, the time-series-data acquirer 11 receives the feature values at time "t" from the sensor devices 1 to M. The received M feature values are provided for the action determiner 15. Note that a preprocess can be carried out before transmission to the action determiner 15. If the collected time-series data is hereafter used as learning data, the received M feature values are stored in the time-series data DB_12 in association with time "t".

In step S202, the action determiner 15 acquires the M feature values "$x^{(t)}$" at time "t" from the time-series-data acquirer 11. The action determiner 15 acquires the model tree stored in the model DB_16.

Application of the feature value "$x^{(t)}$" to the model tree identifies the classification model to be applied. If the classification performance of the specified classification model is "high", the right or wrong determination is performed using the specified classification model. That is, the objective variable "$y^{(t)}$" at time "t" is calculated. Based on the calculated "$y^{(t)}$", output data including the result of the right or wrong determination is provided for the notifier 17. The result of the right or wrong determination may be the value of "$y^{(t)}$" itself, or text of "correct" (correct answer) or "incorrect" (incorrect answer).

On the contrary, if the classification performance of the specified classification model is "low", the right or wrong determination based on the classification model is not performed. In this case, output data including the determination result of "correct" as the result of the right or wrong determination may be provided for the notifier 17, or output data including a value, such as "NA" as the result of the right or wrong determination, indicating that the right or wrong determination has not been performed may be provided for the notifier 17. Alternatively, no value may be output.

In step S203, the notifier 17 transmits output data including the result of the right or wrong determination at time "t" acquired from the action determiner 15, to a predesignated apparatus.

Through repetition of the operations in steps S201 to S203 for times 1, . . . , T, the result of the right or wrong determination at each time is notified to the predesignated apparatus.

Figure 15:
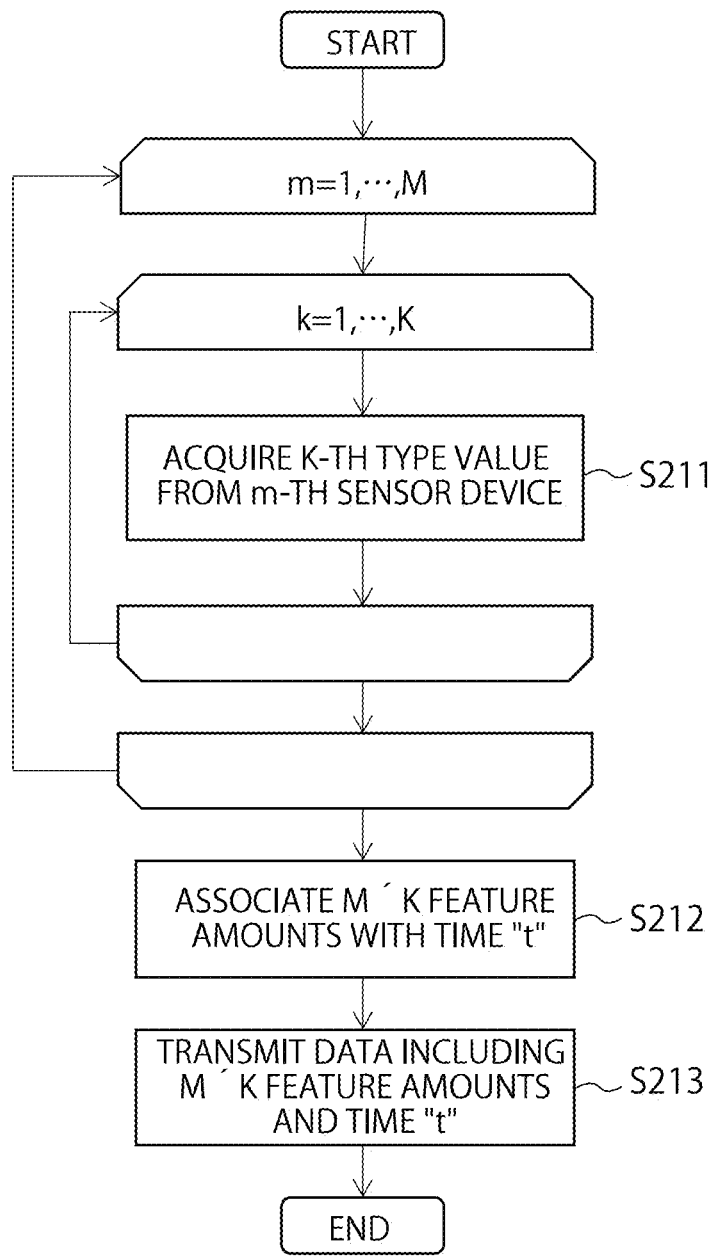
FIG. 15 is a diagram showing a detailed flow of the time-series-data acquirer.

FIG. 15 shows a detailed flow of the time-series-data acquirer 11 performed in step S201 in FIG. 14. The flow in FIG. 15 indicates the operation at a time (here, time "t").

In step S211, the time-series-data acquirer 11 acquires data on values of K types (for example, in a case where one sensor device detects values in the X axis, the Y axis, and the Z axis, K=3) from each of the M sensor devices installed on the observation target. Each of "M" and "K" is an integer of one or more.

In step S212, the obtained data is associated with time "t".

In step S213, the data associated with time "t" is provided for the action determiner 15.

In the time-series-data acquirer 11, a preprocess may be executed for the acquired data. The preprocess is the same as the preprocess during learning data generation in the label setter 13 described above, for example.

Figure 16:
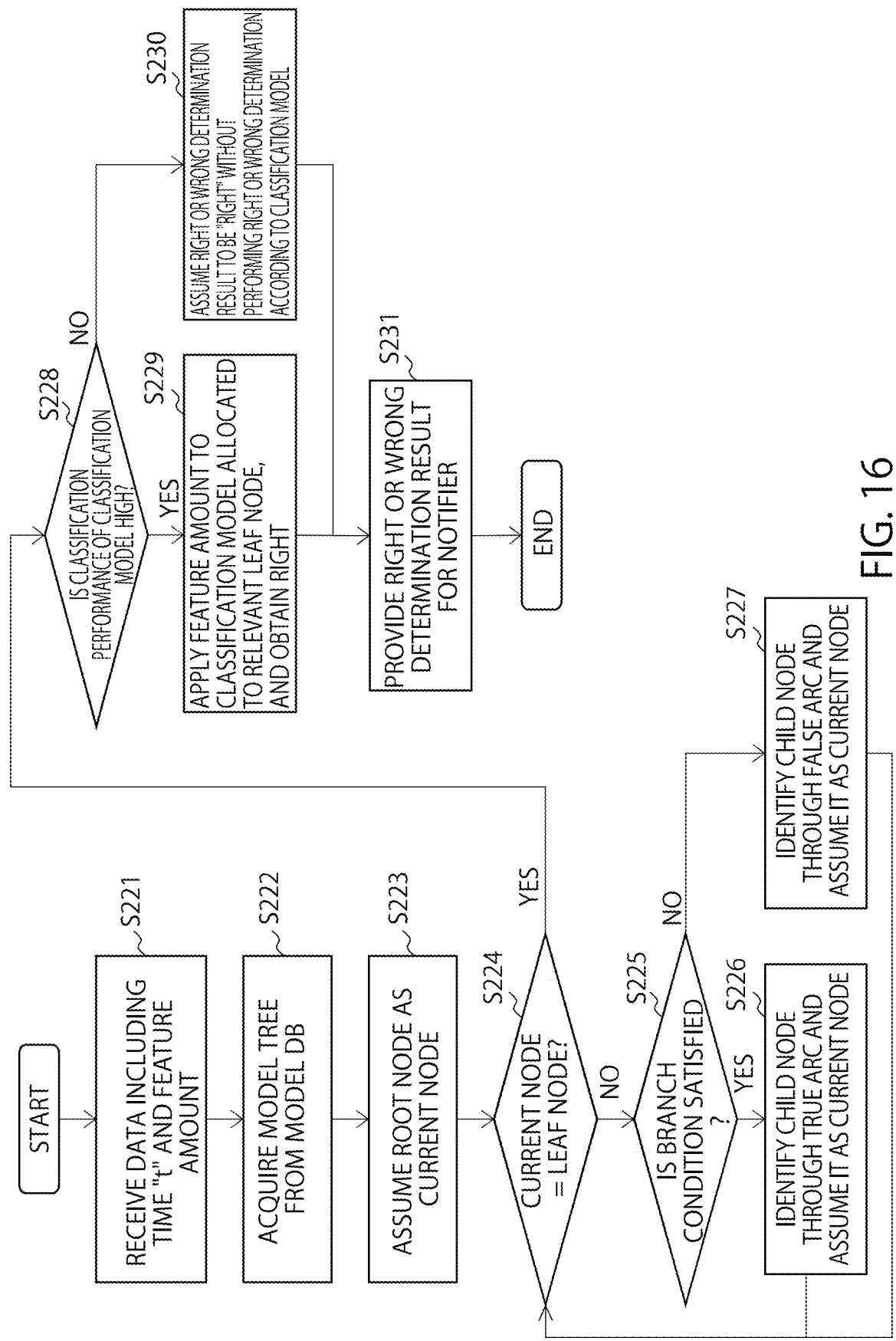
FIG. 16 is a diagram showing a detailed flow of an action determiner.

FIG. 16 shows a detailed flow of the action determiner 15 performed in step S202 in FIG. 14. In the following explanation, a current node is a node serving as a target of determination of whether the branch condition is satisfied.

In step S221, data including the feature value and time "t" is received from the time-series-data acquirer 11.

In step S222, the model tree is acquired from the model DB_16. Specifically, the branch condition table and the model parameter table are acquired (see FIG. 6).

In step S223, the node ID having "root" on the node type column of the branch condition table is specified, and the node having the specified node ID is set as the current node.

In step S224, it is determined whether the current node is a leaf node. Specifically, on the node type column of the branch condition table, it is determined whether the value of the current node ID is "leaf".

If the current node is a leaf node, the processing proceeds to step S228. If the current node is not a leaf node, the processing proceeds to step S225.

In step S225, based on the branch condition of the current node and the time included in the data, it is determined whether the branch condition is satisfied.

If the branch condition is satisfied in step S225, a child node is specified along the arc assigned "true" (the left arc in the example of FIG. 5) in step S226. The specified child node is assumed as the current node, and the processing returns to step S224.

If the branch condition is not satisfied in step S225, a child node is specified along the arc assigned "false" (the right arc in the example of FIG. 5) in step S227. The specified child node is assumed as the current node, and the processing returns to step S224.

In step S228, it is specified whether the classification performance of the classification model associated with the current node (leaf node) is high. Specifically, the model ID corresponding to the node ID of the current node is specified from the branch condition table. On the model parameter table, the value of the classification performance corresponding to the specified model ID is specified. It is specified whether the specified value is "high" or "low".

If it is determined that the classification performance of the classification model is high in step S228, the right or wrong determination is performed based on the classification model (the model parameter corresponding to the model ID on the model parameter table) and on the feature value included in the data in step S229. The result of the right or wrong determination is obtained.

If it is determined that the classification performance of the classification model is low in step S228, the right or wrong determination according to the classification model is not performed and the result of the right or wrong determination is determined to be "correct" in step S230. Alternatively, the result of the right or wrong determination may be assumed to be "undetermined", for example; a value indicating that determination based on the classification model has not been performed may be assumed as the result of the right or wrong determination.

In step S231, output data including the result of the right or wrong determination obtained in step S229 or S230 is provided for the notifier 17.

FIG. 17 is a diagram showing an example of a result of determination on the actions in FIGS. 14 to 16 for the time-series data including multiple times 1 to T. For each time, "RIGHT" or "WRONG" is indicated as the determination result. Result data in FIG. 17 may be displayed on a display apparatus to allow a user of this apparatus to confirm the determination result. The result data in FIG. 17 includes the section, time, and determination result. The column of section stores the values of classification performance of the classification model used in the time section to which the time belongs. In a case of "HIGH CLASSIFICATION PERFORMANCE", "RIGHT" or "WRONG" is determined using the classification model, and the determination result is stored on the column of the determination result. In the case of "HIGH CLASSIFICATION PERFORMANCE", "RIGHT" is stored uniformly on the column of the determination result.

As described above, according to this embodiment, based on a plurality of time-series data for learning to which the training label of a correct or incorrect answer is allocated, the classification model is generated for each time section. In a case of performing the right or wrong determination for each time in the time-series data serving as an evaluation target, the classification model is used to perform the right or wrong determination in the time sections where classification models having high classification performances are generated.

For the time sections where classification models having low classification performances are generated, determination based on the classification model is not performed. In this case, "correct" (correct answer) is always output as the result of the right or wrong determination, or information, such as "undetermined", indicating that the right or wrong determination has not been performed is output as the result of the right or wrong determination.

That is, in the time sections where the classification models having low classification performances are generated, the time-series data to which the training label of a correct answer is allocated, and the time-series data to which the training label of an incorrect answer is allocated each have the same or similar waveform. Accordingly, it can be considered that no waveform capable of effectively determining right or wrong is obtained. That is, it can be determined that in the time section, the correct action is always performed. For such a time section, "correct" is always output as the right or wrong determination and no right or wrong determination is performed, thereby allowing the calculation load to be reduced. Alternatively, outputting information as the right or wrong determination, such as "undetermined", indicating that the right or wrong determination has not been performed can prevent the accuracy of the right or wrong determination from decreasing.

Figure 18:
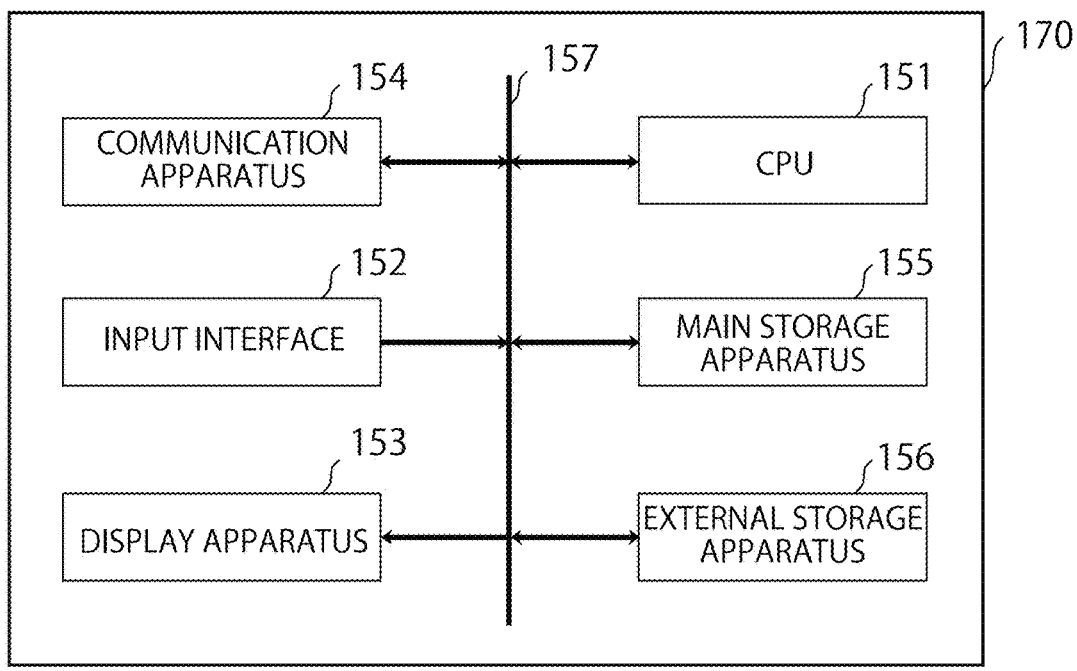
FIG. 18 is a diagram showing a hardware configuration of the information processing apparatus according to the first embodiment.

FIG. 18 illustrates a hardware configuration of the information processing apparatus 101 according to the present embodiment. The information processing apparatus 101 according to the present embodiment is configured with a computer device 100. The computer device 100 includes a CPU 151, an input interface 152, a display device 153, a communication device 154, a main storage device 155 and an external storage device 156, and these are connected to each other with a bus 157.

The CPU (Central Processing Unit) 151 executes a computer program which realizes the above-described respective functional configurations of the information processing apparatus 101 on the main storage device 155. By the CPU 151 executing the computer program, the respective functional configurations are realized.

The input interface 152 is a circuit for inputting an operation signal from the input device such as a keyboard, a mouse and a touch panel, to the information processing apparatus 101. The input function of the information processing apparatus 101 can be constructed on the input interface 152.

The display device 153 displays data or information output from the information processing apparatus 101. While the display device 153 is, for example, an LCD (Liquid Crystal Display), a CRT (Cathode-Ray Tube), and a PDP (Plasma Display Panel), the display device 153 is not limited to this. The data or the information output from the computer device 100 can be displayed by this display device 153. The output device of the information processing apparatus 101 can be constructed on the display device 153.

The communication device 154 is a circuit for the information processing apparatus 101 to communicate with an external device in a wireless or wired manner. Information can be input from the external device via the communication device 154. Information input from the external device can be stored in a DB. The communicator 17 can be constructed on the communication device 154.

The main storage device 155 stores a program which realizes processing of the present embodiment, data required for execution of the program, data generated by execution of the program, and the like. The program is developed and executed on the main storage device 155. While the main storage device 155 is, for example, a RAM, a DRAM and an SRAM, the main storage device 155 is not limited to this. The storage in each embodiment may be constructed on the main storage device 155.

The external storage device 156 stores the above-described program, data required for execution of the program, data generated by execution of the program, and the like. These kinds of program and data are read out to the main storage device 155 upon processing of the present embodiment. While the external storage device 156 is, for example, a hard disk, an optical disk, a flash memory and a magnetic tape, the external storage device 156 is not limited to this. The storage in each embodiment may be constructed on the external storage device 156.

Note that the above-described program may be installed in the computer device 100 in advance or may be stored in a storage medium such as a CD-ROM. Further, the program may be uploaded on the Internet.

Note that the computer device 100 may include one or a plurality of the processors 151, the input interfaces 152, the display devices 153, the communication devices 154 and the main storage devices 155, or peripheral equipment such as a printer and a scanner may be connected to the computer device 100.

Further, the information processing apparatus 101 may be configured with a single computer device 100 or may be configured as a system including a plurality of computer devices 100 which are connected to each other.

Second Embodiment

In a second embodiment, the observation target is an automatic guided vehicle (AGV). Note that the observation target in this embodiment may be a mobile body, such as a drone or a bus, only if the mobile body is planned to travel periodically on the same or substantially same route. The action of the observation target in this embodiment is travel of the mobile body.

Figure 19:
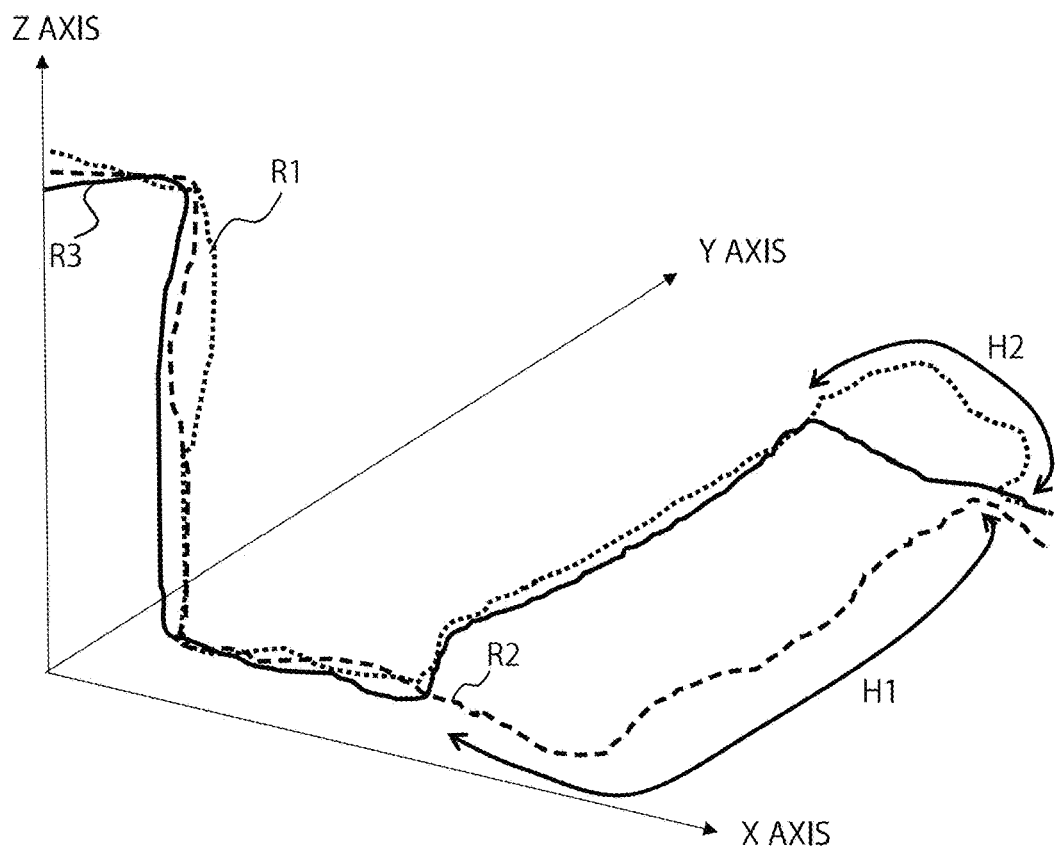
FIG. 19 is a diagram of an image of a route (a traffic line) traced by an AGV by moving.

FIG. 19 is a diagram of an image of a track (a traffic line) traced by an AGV by moving. Three routes R1 to R3 are shown.

The AGV is an automatic guided vehicle. Accordingly, in general, it travels substantially along a predetermined route substantially at a predetermined speed. In a case of an AGV traveling on a floor of a factory, the route on which it travels is managed based on time information and position information, for example. The position information is indicated by two axes (X axis and Y axis) or three axes (X axis, Y axis and Z axis). As an example of three axes, there is a case where the AGV travels in the Z axis using a rail installed on the ceiling of a factory.

In some cases, the AGV cannot travel along a planned route and is required to change the route. For example, an obstacle is present on the route, or the route conflicts with a route of another AGV. If the route is changed but the change does not affect the operation plan, it is determined that the action of the AGV is a correct action. If the change affects the operation plan, it is determined that the action is an incorrect action. Cases of whether the operation plan is affected or not include a case whether or not an scheduled arrival time is delayed by a certain time period or more. The cases also include a case whether there is a collision with an obstacle or not. Other cases may be adopted.

For example, it is assumed that the route R3 is an expected route without change in route. On the route R1, travel is made through a site different from that in the route R3 in a range H1. However, there is no delay by a certain time period or longer from the scheduled arrival time. Accordingly, the action on the route R1 is determined as a correct action. Also on the route R2, travel is made through a site different from that in the route R3 in a range H2. However, there is a delay by a certain time period or longer from the scheduled arrival time. Accordingly, the action on the route R2 is determined as an incorrect action (wrong action).

The user of this apparatus observes the travel of the AGV. If the AGV travels along a scheduled route, a training label of a correct answer is allocated. If travel is made along an unexpected route but it does not affect the operation plan, the training label of the correct answer is also allocated. If travel is made along an unexpected route and it affects the operation plan, the training label of the incorrect answer is allocated. The method of allocating the training label is similar to that in the first embodiment.

Figure 20:
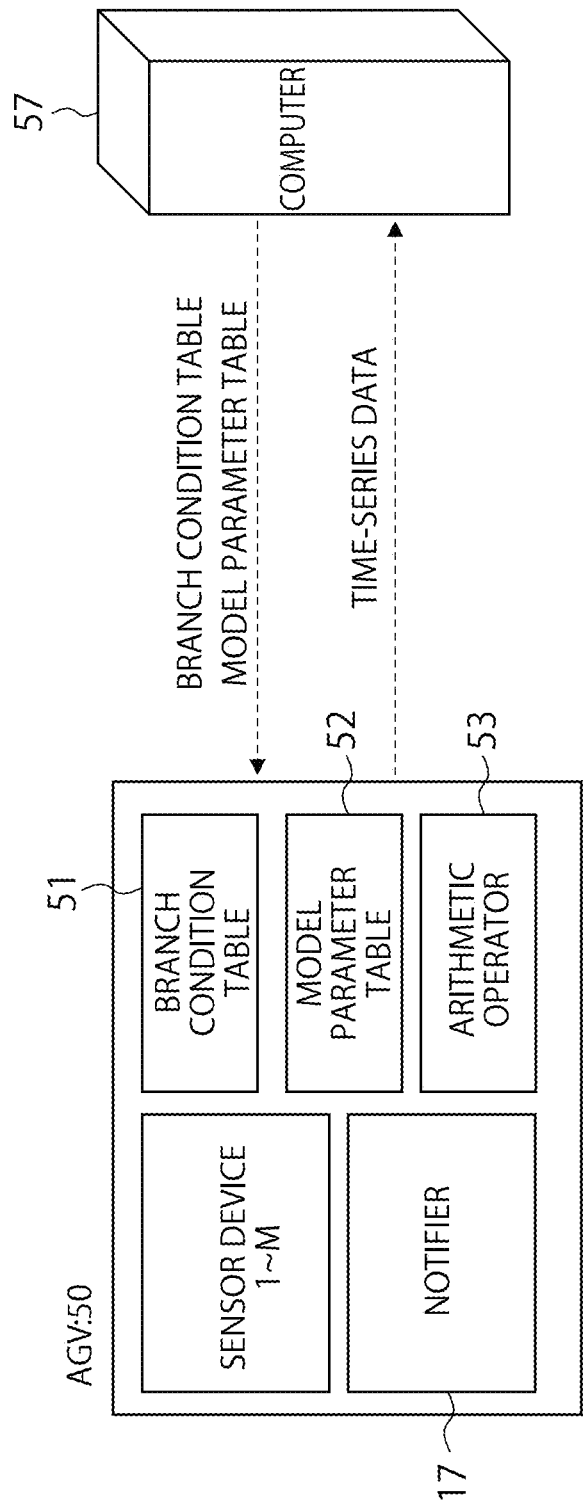
FIG. 20 is a block diagram of a warning system, which is an information processing system according to a second embodiment.

FIG. 20 is a block diagram of a warning system, which is an information processing system according to the second embodiment. The warning system in FIG. 20 is a system for smoothly advancing the operation of the AGV by mounting the model tree on the AGV as with edge computing. The system includes one or more AGVs 50 and a computer 57. The AGV 50 includes sensor devices 1 to M, a notifier 17, a model tree (a branch condition table 51 and a model parameter table 52), and an arithmetic operator 53. The arithmetic operator 53 is a CPU or a microcomputer, and has the functions of the time-series-data acquirer 11 and the action determiner 15 in FIG. 1. The computer 57 collects time-series data from the sensor devices 1 to M of the AGV 50. The user allocates the training label to the time-series data. The computer 57 generates the branch condition table 51 and the model parameter table 52 based on the time-series data with the training label, and provides the tables for the AGV 50.

The AGV 50 travels on a route designated by the computer 57 or a management apparatus, not shown. The arithmetic operator 53 determines whether to perform the right or wrong determination, based on the data collected by the sensor devices 1 to M at each time and on the model tree. If the right or wrong determination is determined to be performed, the right or wrong determination is performed using the relevant classification model, based on the model parameter table 52. If the right or wrong determination is not performed, data, such as "correct answer" or "undetermined", is output as the result of the right or wrong determination.

If an incorrect answer is obtained as the result of the right or wrong determination, the notifier 17 outputs warning data. For example, it turns on a lamp or outputs a sound. Immediately after a human crosses the route of the AGV and the AGV avoids the human and enters a route to affect the operation plan, for example, the human is made to step away from the route immediately by the warning to allow the AGV to return to the original route. This negates the need AGV's route change which is to affect the operation plan. On the contrary, if a correct answer is obtained as the result of the right or wrong determination, the operation plan is not affected even if the route is required to be changed. Accordingly, human walking is allowed to take priority.

Third Embodiment

Figure 21:
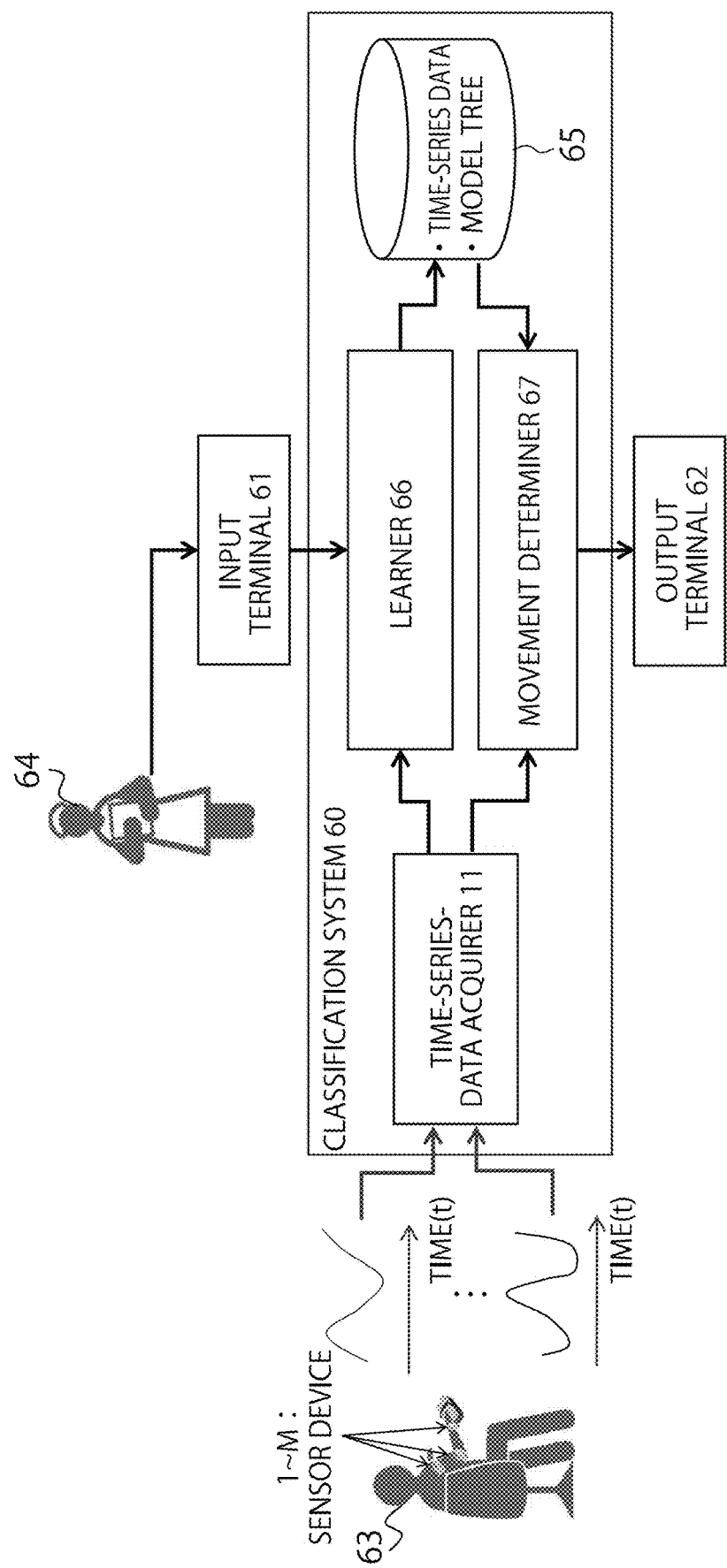
FIG. 21 is a block diagram of a classification system, which is an information processing system according to a third embodiment.

FIG. 21 is a block diagram of a classification system 60, which is an information processing system according to a third embodiment. The classification system 60 performs right or wrong determination of an action of a rehabilitation practitioner, who is a human. The classification system 60 includes a time-series-data acquirer 11, a learner 66, an action determiner 67, and a data storage 65. The learner 66 has the functions of the label setter 13 and the model generator 14 in FIG. 1. The action determiner 67 has the functions of the action determiner 15 and the notifier 17 in FIG. 1. The data storage 65 has the functions of the time-series data DB_12 and the model DB_16 in FIG. 1.

The rehabilitation practitioner 63 wears sensor devices 1 to M at respective parts of the body. The sensor devices 1 to M include, for example, acceleration sensors, speed sensors, magnetism sensors, etc. Every time a rehabilitation action is executed, the time-series-data acquirer 11 acquires waveform data on a track of the action (time-series data).

An observer 64, such as a specialist or a supervisor, observes the action of the rehabilitation practitioner, determines whether the action is right or wrong, and inputs, through an input terminal 61, the training label indicating a correct or incorrect answer as a result of determination. The learner 66 associates the training label with the time-series data, and stores the associated label and data in the data storage 65.

The learner 66 generates a model tree, based on the time-series data to which the training label is allocated.

The rehabilitation practitioner 63 wears the sensor devices 1 to M in a state where the observer 64 is absent, and performs a rehabilitation action. The time-series-data acquirer 11 receives waveform data of the action from the sensor devices 1 to M. At each time, it is determined whether the right or wrong determination is to be performed, using the model tree. If the right or wrong determination is determined to be performed, the right or wrong determination is performed using the relevant classification model. If the right or wrong determination is not performed, data, such as "correct answer" or "undetermined", is output as the result of the right or wrong determination. If the result of the right or wrong determination is an incorrect answer, information indicating an error is output to an output terminal 62. If the result of the right or wrong determination is a correct answer, information indicating that the action of the rehabilitation practitioner 63 is right is output to the output terminal 62. The output terminal 62 may be a terminal of the rehabilitation practitioner 63 or the observer 64, or a server that stores data.

Fourth Embodiment

As for the demand amount of power in homes, factories and the like, similar time-series data tends to be obtained, if the conditions are common. The conditions include: time conditions, such as days of the week and time slots; position conditions, such as urban areas and underpopulated areas; and weather conditions, such as air temperatures. Accordingly, based on such conditions, there is a method of grouping data into similar time-series data through a determination tree or a clustering method, and of performing power demand prediction on a group-by-group basis. The power demand prediction predicts the demand amount in the future based on previous demand amounts. Prediction on a group-by-group basis can improve the accuracy of prediction.

However, on singularities when certain events occur, or in time slots (singular time slots) when events occur, similar time-series data are not necessarily obtained even if the conditions are common. In this case, there is a possibility of reduction in the accuracy of power demand prediction. Accordingly, this embodiment combines such a power demand prediction method, which uses the determination tree or the clustering method, with the first embodiment, thus proposing a method of facilitating analysis of singularities and singular time slots. This can improve the accuracy of the power demand prediction. The observation target in this embodiment, is the power demand amount. An action of the observation target is change in power demand amount.

Figure 22:
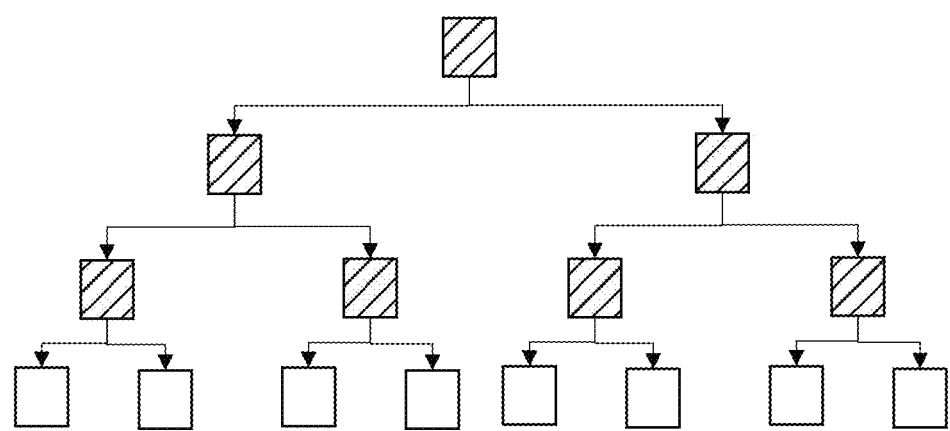
FIG. 22 is a diagram showing an example of a determination tree in a power demand prediction.

FIG. 22 is a diagram showing an example of a determination tree in a power demand prediction. Internal nodes indicated by hatched rectangles include branch conditions that include at least one of a time condition, a position condition, and a weather condition. Time-series data on the power demand amount (for example, the power demand amount for a day) is classified into any of leaf nodes by determining whether to satisfy at least one of the time condition, the position condition and the weather condition in each internal node of the determination tree. Similar classification of a plurality of time-series data allocates similar time-series data groups, as the same group, to each leaf node. The leaf nodes are represented by outlined blank rectangles.

The plurality of time-series data allocated to the same group are used to generate a power demand prediction model that predicts power demand amounts in the future from previous power demand amounts. A number of power demand models as many as the number of group are generated. The model may be any of regression models, such as a linear regression model, a multiple regression model, a logistic regression model, and a neural network, or any model other than these models.

For each identical group, on a plurality of time-series data serving as prediction targets, the prediction values of the power demand model are compared with the achieved values of the power demand, and errors that are differences between the prediction values and the achieved values, are calculated. A training label of a correct answer (a label indicating that the prediction has not been unsuccessful) is allocated to the time-series data having an error less than a threshold. A training label of an incorrect answer (a label indicating that the prediction has been unsuccessful) is allocated to the time-series data having an error equal to or more than the threshold.

Grouping by the determination tree or the clustering method described above, and the demand prediction model generation can be executed by a typical computer.

For each identical group, the time-series data to which the training label is allocated is used as the time-series data for learning in the first embodiment to generate the model tree. Based on the classification performance of the classification model associated with each leaf node of the model tree, time sections having a high classification performance and time sections having a low classification performance are specified. In the time sections having a high classification performance, the time-series data is analyzed by the computer, which can verify the tendency of the waveforms on days or time slots when the prediction has been unsuccessful.

Fifth Embodiment

Figure 23:
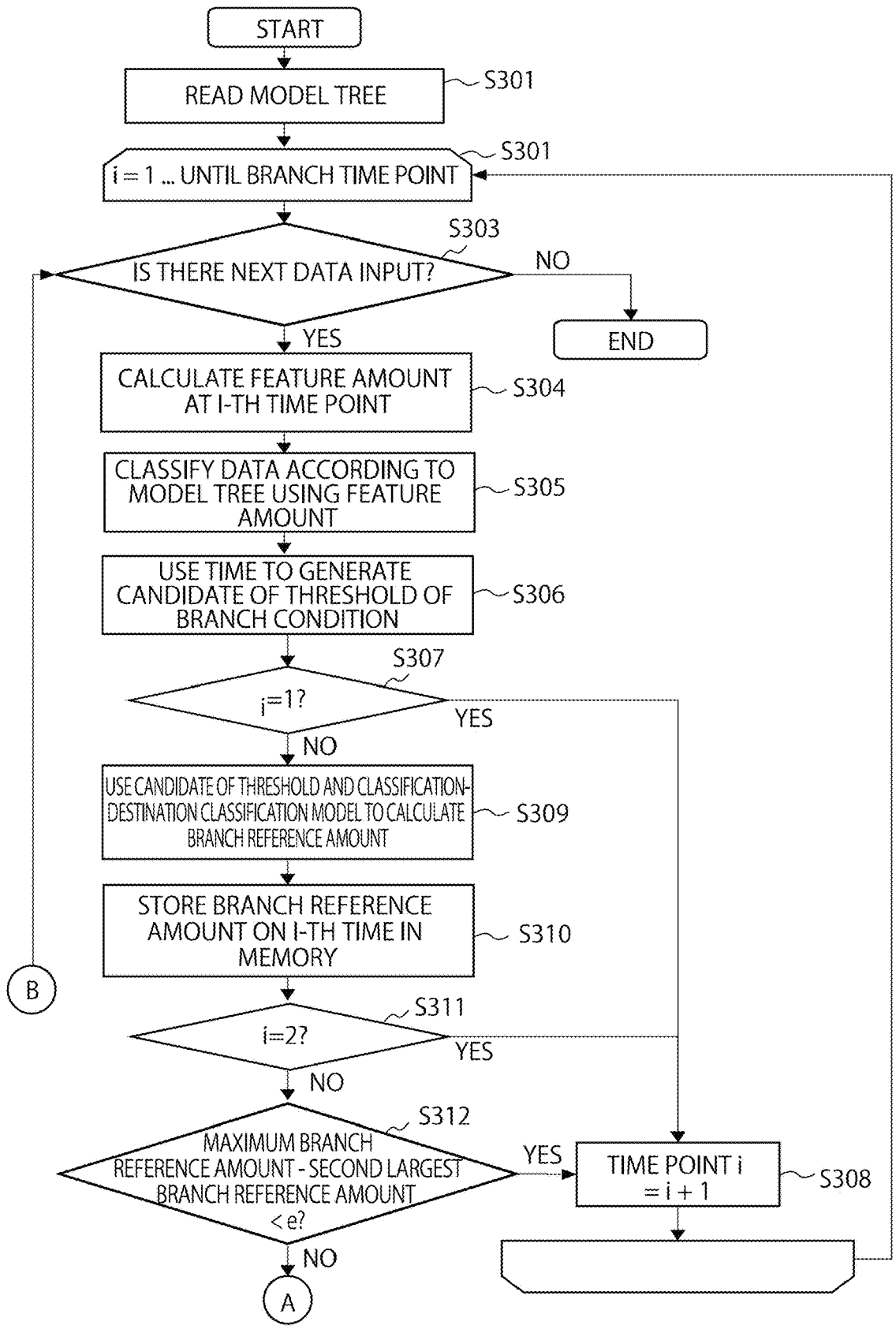
FIG. 23 is a diagram showing a flow of an example of operation according to a fifth embodiment.
Figure 24:
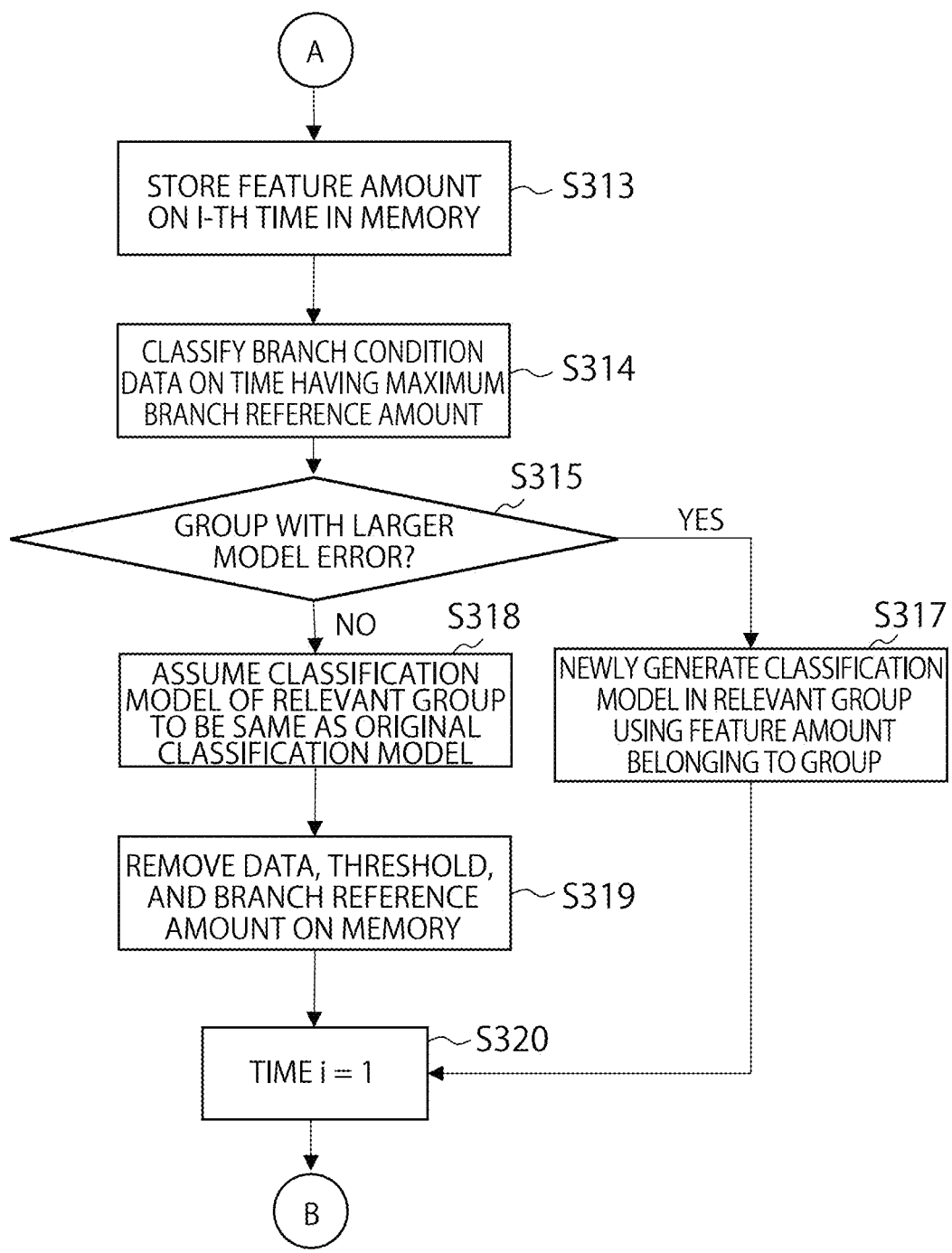
FIG. 24 is a diagram following FIG. 23.

FIGS. 23 and 24 show a flow of updating the model tree according to a fifth embodiment. In the fifth embodiment, the model tree generated in the first embodiment is updated by newly obtained time-series data. The update adds internal nodes in a direction that makes the hierarchical level of the model tree deeper. The branch conditions of the internal nodes already residing in the model tree are maintained. A case is assumed where the time-series data is received according to a stream type scheme. The processes in the flow is performed for each time. Terms used for explaining the flow are defined by the following expressions or symbols.

Learning data (set of instances): $D=\{y, X\}$

True value of objective variable of learning data: $y=(y^{(1)}, \ldots, y^{(m)})T$ The number of instances of learning data: (the number of the times): n Explanatory variable of learning data: $X=(x_1, \ldots, x_m)$; $x_j=(x_j^{(1)}, \ldots, x_j^{(k)})T$ The number of explanatory variables (=the number of dimensions): m Instance: $d^{(i)}=\{y^{(i)}, (x_1^{(i)}, \ldots, x_m^{(i)})\}$, $i=1, \ldots, n$ Prediction value of objective variable: $\hat{y}=(\hat{y}^{(1)}, \ldots, \hat{y}^{(m)})^T$ Error between prediction value of objective variable and true value (model error): $o=(o^{(1)}, \ldots, o^{(m)})^T$; $o^{(i)}=g(\hat{y}^{(i)}, y^{(i)})$ Function of calculating model error: g An overview of the flow is as follows. This flow is executed every time an instance, which is a unit time of the learning data (time-series data) from the beginning, is added.

The branch reference amount serving as a reference when the branch condition for a newly added node is determined, is calculated. The calculation method is the same as that in the first embodiment. For every instance that has already received and serves as a determination target of the branch condition, the difference between the branch condition having the maximum branch reference amount and the branch condition having the second largest branch reference amount is calculated. If the calculated difference is larger than a value calculated according to the Hoeffding Bound condition, the model tree is branched according to the branch condition having the maximum branch reference amount (a new internal node including the branch condition is added).

Hoeffding Bound secures that the probability of holding $$\mu \geq \bar{x} - \varepsilon$$

is "1−δ" where a sample average "x⁻" is calculated with "n" independent observations of values occurring in a section having a range of "R" and a true mean is "μ". The Hoeffding Bound condition is represented as follows.

$$\varepsilon = \sqrt{\frac{R^2 \ln\left(\frac{1}{\delta}\right)}{2n}}$$

"δ" is preset as a parameter.

The model tree branching (addition of a new internal node) is executed when the following conditions are satisfied.

$$o_{j,k} - o'_{j,k} \geq \varepsilon$$

$o_{j,k}$: maximum branch reference amount
$o'_{j,k}$: second largest branch reference amount
n: the number of instances serving as targets
R: range of "xj" used for branch condition Hereinafter, referring to FIGS. 23 and 24, the flow of this embodiment is explained.

In step S301, the action determiner 15 reads the model tree from the model DB_16.

In step S302, the model generator 14 sets time to i=1. When the flow is started, time i=1 corresponds to the time at the beginning in the time-series data.

In step S303, it is determined whether time-series data is input. If no input is made, this processing is finished.

If an input of time-series data is made in step S303, the feature value of the data at time "i" is calculated in step S304.

In step S305, the model generator 14 classifies the data at time "i" according to the model tree using the calculated feature value.

In step S306, a candidate of the threshold of the branch condition is generated using time "i". The method of generating the candidate of the threshold may be similar to that in the first embodiment. The candidate of the threshold to be generated is used for the branch condition for a node to be added when a new branch condition node is added between the leaf nodes into which data at time "i" are classified, and the parent node of the leaf nodes.

In step S307, it is determined whether i=1.

In step S308, it is assumed that i=i+1 in a case of i=1, and the data on the next time is read.

In step S309, if it is not i=1, the branch reference amount is calculated using the candidate of the threshold, and the classification model associated with the leaf node classified according to the model tree. The method of calculating the branch reference amount is the same as that in the first embodiment.

In step S310, the branch reference amount at the i-th time is stored in the memory.

In step S311, it is determined whether i=2. When i=2, it is assumed that i=i+1 in step S308, and the data on a time of the next one is read.

If it is not i=2 (i.e., if "i" is three or more), the difference between the maximum value of the branch reference amount and the second largest branch reference amount among the branch reference amounts having been calculated so far is calculated in step S312. It is determined whether the calculated difference is less than "ε", which is the value of the Hoeffding Bound condition described above. When difference is less than "ε", it is assumed that i=i+1 in step S308, and the data on a time of the next one is read.

If the difference is equal to or more than "ε", the feature value at the i-th time is stored in the memory in step S313 in FIG. 24.

The branch condition including the time of the candidate of the threshold with which the maximum branch reference amount is obtained is generated, and an internal node including the branch condition is added. The data (instances) are classified according to whether the time is before or after the time included in the branch condition, and two groups are generated. For each group, using the classification model specified in step S305, the model error (the difference between the prediction value and the true value according to the classification model) is calculated. The statistical value of the model error (the average, median, maximum value, or minimum value) is calculated.

In step S317, for a group having a larger statistical value of a model error between two groups, the classification model of this group is newly generated using the feature value belonging to the group.

In step S318, for a group having a smaller statistical value of a model error between two groups, the original classification model (the classification model specified in step S305) is used.

In step S319, the data (instance), the threshold, and the branch reference amount on the memory are removed.

In step S320, resetting is performed to achieve i=1. Returning to step S303, if there is not data on a time of next one, the processing is finished. If there is next data, the above steps are repeated.

Figure 25:
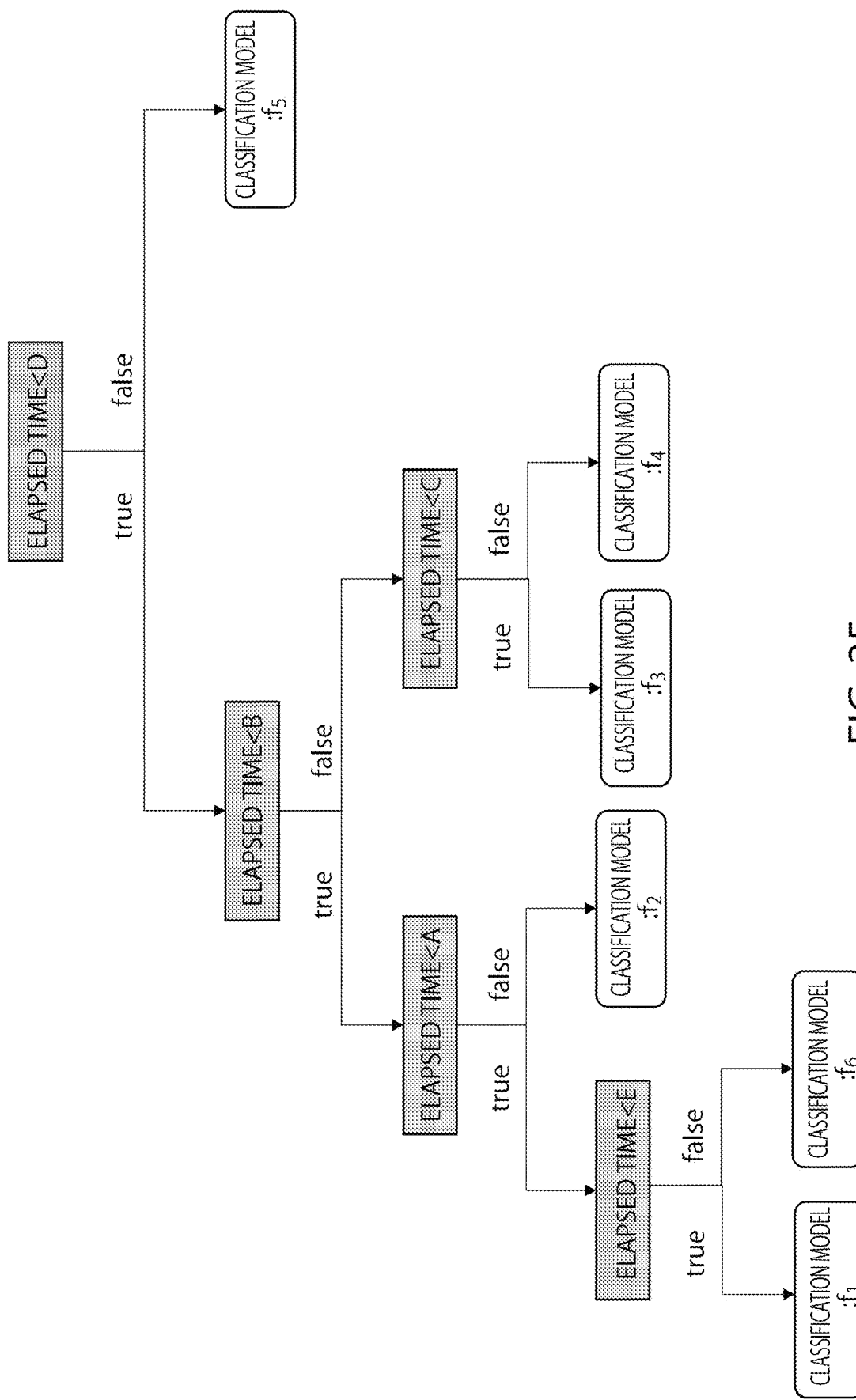
FIG. 25 is a diagram showing an example of updating the model tree.

FIG. 25 schematically showing an example according to this embodiment of updating the model tree in FIG. 5 used for the first embodiment. An internal node of "ELAPSED TIME <E" is added between an internal node including a branch condition of "ELAPSED TIME <A" and a leaf node associated with the classification model $f_1$. The original child node $f_1$ is associated with one of the two child nodes (leaf nodes) of the added internal node. The newly generated classification model $f_6$ is associated with the other leaf node.

In this embodiment, update is performed online in real time. Alternatively, batch processing is also allowed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus, comprising:
   processing circuitry which
   acquires time-series data of at least one sensor on an observation target for a first period of time from a start time to an end time, the first period including a plurality of first time sections,
   sequentially advances a time from the start time to the end time at a time interval to acquire a target time at each time interval, extracts partial data of the target time in the time-series data, identifies a first time section that includes the target time among the plurality of first time sections, a memory which stores a plurality of classification models corresponding to the plurality of first time sections, each of the plurality of classification models being a machine learning model for classifying a state of the observation target at a certain time in the first time section corresponding to a respective one of the plurality of classification models from partial data at the certain time in the time-series data, wherein the processing circuitry specifies a classification model corresponding to the identified first time section from the plurality of classification models in the memory, estimates the state of the observation target at the target time, based on the partial data at the target time in time-series data and the specified classification model, and generates output data including estimated states of the observation target at each target time, and wherein each of the classification models associates an input variable with an output variable representing one state of a plurality of states able to be had by the observation target, the output variable indicates a class of a plurality of classes representing the states able to be had by the observation target, and the class is a first class where the state on the first time is right, or a second class where the state on the first time is wrong.

2. The information processing apparatus according to claim 1, wherein the time-series data is time-series data of an action of the observation target, and the state of the observation target estimated by the processing circuitry is a past state of the observation target.

3. The information processing apparatus according to claim 2, wherein the state of the observation target is a state of one point in time in an action of the observation target.

4. The information processing apparatus according to claim 3, wherein the action of the observation target is a human rehabilitation action.

5. The information processing apparatus according to claim 3, wherein the action of the observation target is a travel of a mobile body.

6. The information processing apparatus according to claim 1, wherein the input variable represents a variable to which data at any time in the time section corresponding to each of the classification models in the time-series data is allocated.

7. The information processing apparatus according to claim 1, wherein the time-series data further includes at least one second time section different from the plurality of first time sections, and the processing circuitry determines whether the target time is included in any one of the first time sections or in any one of the at least one second time sections, and does not estimate the state if the target time is included in any one of the at least one second time section.

8. The information processing apparatus according to claim 7, wherein at least one classification model is associated with the at least one second time section, the first time section is a time section where identification performance of the classification model corresponding to the first time section is higher than a threshold, and the second time section is a time section where the identification performance of the classification model corresponding to the second time section is lower than the threshold.

9. The information processing apparatus according to claim 7, wherein the processing circuitry performs a learning process based on a plurality of the time-series data and on a plurality of the classes allocated to the plurality of the time-series data to determine the first time sections and generates the classification models corresponding to the first time sections.

10. The information processing apparatus according to claim 8, further comprising a model tree including a plurality of nodes, a branch condition concerning a time, and a plurality of the classification models associated with a plurality of end nodes among the plurality of nodes, the processing circuitry determines the classification model to be used to estimate the state of the observation target, by specifying one of the end nodes using the target time and the model tree.

11. The information processing apparatus according to claim 10, wherein based on a plurality of the time-series data and a plurality of classes allocated to the plurality of the time-series data, the processing circuitry generates or updates the model tree.

12. The information processing apparatus according to claim 1, wherein the processing circuitry acquires the time-series data from the at least one sensor.

13. The information processing apparatus according to claim 1, wherein the time-series data is track data of an action of the observation target.

14. The information processing apparatus according to claim 1, wherein the observation target is a demand amount.

15. The information processing apparatus according to claim 1, further comprising the at least one sensor.

16. The information processing apparatus according to claim 1, wherein the processing circuitry determines, as the state of the observation target, whether the state of the observation target is right or wrong.

17. The information processing apparatus according to claim 1, wherein the information processing apparatus further comprises a display which displays information indicating the state estimated for each target time in time order of the target times.

18. An information processing method, comprising:

acquiring time-series data of at least one sensor on an observation target for a first period of time from a start time to an end time, the first period including a plurality of first time sections;

sequentially advancing a time from the start time to the end time at a time interval to acquire a target time at each time interval;

extracting partial data of the target time in the time-series data;
identifying a first time section that includes the target time among the plurality of first time sections;
accessing a memory which stores a plurality of classification models corresponding to the plurality of first time sections, each of the plurality of classification models being a machine learning model for classifying a state of the observation target at a certain time in the first time section corresponding to a respective one of the plurality of classification models from partial data at the certain time in the time-series data;
specifying a classification model corresponding to the identified first time section from the plurality of classification models in the memory;
estimating the state of the observation target at the target time, based on the partial data at the target time in time-series data and the specified classification model; and
generating output data including estimated states of the observation target at each target time,
wherein
each of the classification models associates an input variable with an output variable representing one state of a plurality of states able to be had by the observation target,
the output variable indicates a class of a plurality of classes representing the states able to be had by the observation target, and
the class is a first class where the state on the first time is right, or a second class where the state on the first time is wrong.

19. A non-transitory computer readable medium having a computer program stored therein which causes a computer executing the computer program to perform processes, comprising:
acquiring time-series data of at least one sensor on an observation target for a first period of time from a start time to an end time, the first period including a plurality of first time sections;
sequentially advancing a time from the start time to the end time at a time interval to acquire a target time at each time interval;
extracting partial data of the target time in the time-series data;
identifying a first time section that includes the target time among the plurality of first time sections;
accessing a memory which stores a plurality of classification models corresponding to the plurality of first time sections, each of the plurality of classification models being a machine learning model for classifying a state of the observation target at a certain time in the first time section corresponding to a respective one of the plurality of classification models from partial data at the certain time in the time-series data;
specifying a classification model corresponding to the identified first time section from the plurality of classification models in the memory;
estimating the state of the observation target at the target time, based on the partial data at the target time in time-series data and the specified classification model; and
generating output data including estimated states of the observation target at each target time,
wherein
each of the classification models associates an input variable with an output variable representing one state of a plurality of states able to be had by the observation target,
the output variable indicates a class of a plurality of classes representing the states able to be had by the observation target, and
the class is a first class where the state on the first time is right, or a second class where the state on the first time is wrong.

* * * * *